US010112777B2

(12) United States Patent
King et al.

(10) Patent No.: US 10,112,777 B2
(45) Date of Patent: *Oct. 30, 2018

(54) TRANSPORT SYSTEM POWERED BY SHORT BLOCK LINEAR SYNCHRONOUS MOTORS

(71) Applicant: MAGNEMOTION, INC., Devens, MA (US)

(72) Inventors: Nathanael N. King, Somerville, MA (US); Brian M. Perreault, Stow, MA (US); Tracy M. Clark, Devens, MA (US); Richard D. Thornton, Concord, MA (US); Jason Young, Devens, MA (US); Michael W. Bottasso, Maynard, MA (US)

(73) Assignee: MagneMotion, Inc., Devens, MA (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/096,974

(22) Filed: Apr. 12, 2016

(65) Prior Publication Data
US 2016/0325938 A1 Nov. 10, 2016

Related U.S. Application Data

(63) Continuation of application No. 14/143,802, filed on Dec. 30, 2013, now Pat. No. 9,346,371, which is a (Continued)

(51) Int. Cl.
*B65G 19/02* (2006.01)
*B60L 13/00* (2006.01)
(Continued)

(52) U.S. Cl.
CPC ............ *B65G 19/02* (2013.01); *B60L 13/003* (2013.01); *B60L 13/03* (2013.01); *B60L 13/10* (2013.01);
(Continued)

(58) Field of Classification Search
CPC ........ B60L 11/00; B60L 11/002; B60L 13/00; B60L 13/006; B60L 13/04; B60L 13/16;
(Continued)

(56) References Cited

U.S. PATENT DOCUMENTS 527,857 A 10/1894 Hutin et al.
2,193,076 A 3/1940 Preble
(Continued)

FOREIGN PATENT DOCUMENTS

CA 2 422 341 A1 9/2004
CH 427872 A 1/1967
(Continued)

OTHER PUBLICATIONS

U.S. Appl. No. 11/770,701, filed Jun. 28, 2007 Linear Synchronous Motor Power Control System and Methods.
(Continued)

*Primary Examiner* — Robert J McCarry, Jr.
(74) *Attorney, Agent, or Firm* — Fletcher Yoder, P.C.

(57) ABSTRACT

Aspects of the invention provide a transport system powered by short block Linear Synchronous Motors (LSMs). The use of short blocks allows vehicles to move under precise control even when they are in close proximity to each other. The design allows the vehicles to be propelled and guided while negotiating sharp turns and negotiating merge and diverge switches. A coreless LSM can be used to create propulsive force without attractive force so as to allow a relatively high drag vehicle suspension, such as a vehicle sliding on a smooth surface.

51 Claims, 14 Drawing Sheets

Straight guideway showing vehicles moving in close proximity.

Related U.S. Application Data continuation of application No. 12/359,022, filed on Jan. 23, 2009, now Pat. No. 8,616,134.

(51) Int. Cl.
| | |
|---|---|
| *B60L 13/10* | (2006.01) |
| *B60L 13/03* | (2006.01) |
| *B65G 35/06* | (2006.01) |
| *B65G 54/02* | (2006.01) |
| *H02K 41/03* | (2006.01) |

(52) U.S. Cl.
CPC .............. *B65G 35/06* (2013.01); *B65G 54/02* (2013.01); *H02K 41/031* (2013.01); *B60L 2200/26* (2013.01)

(58) Field of Classification Search
CPC ......... B60L 15/00; B60L 15/002; B60M 1/00; B60M 1/02; B60M 1/16; B60M 1/30
See application file for complete search history.

(56) References Cited

U.S. PATENT DOCUMENTS

| | | |
|---|---|---|
| 2,684,753 A | 7/1954 | Kolbe et al. |
| 2,772,640 A | 12/1956 | Nystrom |
| 2,873,843 A | 2/1959 | Wilson |
| 3,029,893 A | 4/1962 | Mountjoy |
| 3,158,765 A | 11/1964 | Polgreen |
| 3,179,241 A | 4/1965 | Kain |
| 3,308,312 A | 3/1967 | Ehrenberg |
| 3,376,578 A | 4/1968 | Sawyer |
| 3,426,887 A | 2/1969 | Ward et al. |
| 3,440,600 A | 4/1969 | Frech et al. |
| 3,513,338 A | 5/1970 | Poloujadoff |
| 3,532,934 A | 10/1970 | Ballman |
| 3,547,041 A | 12/1970 | Izhelya et al. |
| 3,607,659 A | 9/1971 | Bloomer |
| 3,609,676 A | 9/1971 | Jauquet et al. |
| 3,617,890 A | 11/1971 | Kurauchi et al. |
| 3,628,462 A | 12/1971 | Holt |
| 3,636,508 A | 1/1972 | Ogilvy et al. |
| 3,638,093 A | 1/1972 | Ross |
| 3,656,015 A | 4/1972 | Gillum |
| 3,661,091 A | 5/1972 | Noble |
| 3,663,131 A | 5/1972 | Hegewaldt et al. |
| 3,669,247 A | 6/1972 | Pulver |
| 3,670,659 A | 6/1972 | Schurch |
| 3,675,585 A | 7/1972 | Wiart et al. |
| 3,679,874 A | 7/1972 | Fickenscher |
| 3,696,753 A | 10/1972 | Ross et al. |
| 3,706,922 A | 12/1972 | Inagaki |
| 3,708,059 A | 1/1973 | Ackermann |
| 3,719,869 A | 3/1973 | Coho |
| 3,721,874 A | 3/1973 | Pelenc et al. |
| 3,749,025 A | 7/1973 | Giraud |
| 3,762,334 A | 10/1973 | Larson |
| 3,763,788 A | 10/1973 | Pougue |
| 3,768,417 A | 10/1973 | Thornton et al. |
| 3,772,640 A | 11/1973 | Auer, Jr. et al. |
| 3,782,291 A | 1/1974 | Maison |
| 3,786,411 A | 1/1974 | Kurauchi et al. |
| 3,788,447 A | 1/1974 | Stephanoff |
| 3,788,455 A | 1/1974 | Dieckmann, Jr. |
| 3,792,665 A | 2/1974 | Nelson |
| 3,803,466 A | 4/1974 | Starkey |
| 3,808,977 A | 5/1974 | Smoot et al. |
| 3,834,318 A | 9/1974 | Fellows et al. |
| 3,835,785 A | 9/1974 | Kirschner et al. |
| 3,842,751 A | 10/1974 | Thornton et al. |
| 3,845,720 A | 11/1974 | Bohn et al. |
| 3,847,088 A | 11/1974 | Karch |
| 3,850,108 A | 11/1974 | Winkle |
| 3,850,109 A | 11/1974 | Thornton |
| 3,858,521 A | 1/1975 | Atherton et al. |
| 3,860,300 A | 1/1975 | Lyman |
| 3,860,843 A | 1/1975 | Kawasaki et al. |
| 3,871,301 A | 3/1975 | Kolm et al. |
| 3,874,299 A | 4/1975 | Silva et al. |
| 3,874,301 A | 4/1975 | Alimanestianu |
| 3,882,789 A | 5/1975 | Simon et al. |
| 3,890,421 A | 6/1975 | Habozit |
| 3,899,979 A | 8/1975 | Godsey, Jr. |
| 3,904,942 A | 9/1975 | Holtz |
| 3,906,436 A | 9/1975 | Kurauchi et al. |
| 3,908,555 A | 9/1975 | Henderson et al. |
| 3,912,991 A | 10/1975 | Moyse et al. |
| 3,912,992 A | 10/1975 | Lamb et al. |
| 3,927,735 A | 12/1975 | Miericke et al. |
| 3,937,148 A | 2/1976 | Simpson |
| 3,938,018 A | 2/1976 | Dahl |
| 3,974,778 A | 8/1976 | Black et al. |
| 3,979,091 A | 9/1976 | Gagnon et al. |
| 3,994,236 A | 11/1976 | Dull et al. |
| 4,013,014 A | 3/1977 | Holtz |
| 4,015,540 A | 4/1977 | Roxberry |
| 4,023,753 A | 5/1977 | Dobler et al. |
| 4,044,881 A | 8/1977 | Chai et al. |
| 4,061,089 A | 12/1977 | Sawyer |
| 4,065,706 A | 12/1977 | Gosling et al. |
| 4,068,152 A | 1/1978 | Nakamura et al. |
| 4,081,723 A | 3/1978 | Vetter et al. |
| 4,088,379 A | 5/1978 | Perper |
| 4,109,584 A | 8/1978 | Mihirogi |
| 4,123,175 A | 10/1978 | Carlson et al. |
| 4,132,175 A | 1/1979 | Miller et al. |
| 4,140,063 A | 2/1979 | Nakamura |
| 4,160,181 A | 7/1979 | Lichtenberg |
| 4,292,465 A | 9/1981 | Wilson et al. |
| 4,311,853 A | 1/1982 | Cree |
| 4,311,953 A | 1/1982 | Fukuda et al. |
| 4,318,038 A | 3/1982 | Munehiro |
| 4,348,618 A | 9/1982 | Nakamura et al. |
| 4,352,960 A | 10/1982 | Dormer et al. |
| 4,361,095 A | 11/1982 | Gibson |
| 4,361,202 A | 11/1982 | Minovitch |
| 4,395,746 A | 7/1983 | Tanaka et al. |
| 4,401,181 A | 8/1983 | Schwarz et al. |
| 4,415,959 A | 11/1983 | Vinciarelli |
| 4,424,463 A | 1/1984 | Musil |
| 4,427,905 A | 1/1984 | Sutton |
| 4,441,604 A | 4/1984 | Schlig et al. |
| 4,444,550 A | 4/1984 | Loubier |
| 4,454,457 A | 6/1984 | Nakamura et al. |
| 4,472,706 A | 9/1984 | Hodge et al. |
| 4,513,235 A | 4/1985 | Acklam et al. |
| 4,522,128 A | 6/1985 | Anderson |
| 4,538,214 A | 8/1985 | Fisher et al. |
| 4,542,311 A | 9/1985 | Newman et al. |
| 4,571,236 A | 2/1986 | Adams |
| 4,583,028 A | 4/1986 | Angersbach et al. |
| 4,592,034 A | 5/1986 | Sachse et al. |
| 4,595,870 A | 6/1986 | Chitayat |
| 4,595,877 A | 6/1986 | Dulk et al. |
| 4,603,640 A | 8/1986 | Miller et al. |
| 4,633,108 A | 12/1986 | von der Heide et al. |
| 4,635,560 A | 1/1987 | Ballantyne |
| 4,638,192 A | 1/1987 | von der Heide et al. |
| 4,639,648 A | 1/1987 | Sakamoto |
| 4,646,651 A | 3/1987 | Yamamura et al. |
| 4,665,829 A | 5/1987 | Anderson |
| 4,665,830 A | 5/1987 | Anderson et al. |
| 4,666,829 A | 5/1987 | Glenner et al. |
| 4,671,185 A | 6/1987 | Anderson et al. |
| 4,675,582 A | 6/1987 | Hommes et al. |
| 4,678,971 A | 7/1987 | Kanazawa et al. |
| 4,689,530 A | 8/1987 | Nakamura et al. |
| 4,692,654 A | 9/1987 | Umemura et al. |
| 4,698,895 A | 10/1987 | Miller et al. |
| 4,698,996 A | 10/1987 | Kreft et al. |
| 4,704,568 A | 11/1987 | Beck et al. |
| 4,704,792 A | 11/1987 | Itagaki et al. |
| 4,711,182 A | 12/1987 | Alexandrov et al. |
| 4,714,400 A | 12/1987 | Barnett et al. |

(56) References Cited

U.S. PATENT DOCUMENTS

| | | |
|---|---|---|
| 4,720,008 A | 1/1988 | Ufland |
| 4,721,045 A | 1/1988 | Okawa et al. |
| 4,721,892 A | 1/1988 | Nakamura et al. |
| 4,726,299 A | 2/1988 | Anderson |
| 4,732,087 A | 3/1988 | Morishita et al. |
| 4,736,747 A | 4/1988 | Drake |
| 4,746,849 A | 5/1988 | Rosshirt |
| 4,760,294 A | 7/1988 | Hansen |
| 4,769,580 A | 9/1988 | Heidelberg et al. |
| 4,776,464 A | 10/1988 | Miller et al. |
| 4,782,342 A | 11/1988 | Walton |
| 4,786,891 A | 11/1988 | Ueda et al. |
| 4,789,815 A | 12/1988 | Kobayashi et al. |
| 4,794,865 A | 1/1989 | Lindberg |
| 4,800,328 A | 1/1989 | Bolger et al. |
| 4,800,818 A | 1/1989 | Kawaguchi et al. |
| 4,808,892 A | 2/1989 | Dreibelbis |
| 4,811,667 A | 3/1989 | Morishita et al. |
| 4,825,111 A | 4/1989 | Hommes et al. |
| 4,826,344 A | 5/1989 | Rakiec |
| 4,829,445 A | 5/1989 | Burney |
| 4,836,344 A | 6/1989 | Bolger |
| 4,841,869 A | 6/1989 | Takeuchi et al. |
| 4,847,526 A | 7/1989 | Takehara et al. |
| 4,849,664 A | 7/1989 | Miyazaki et al. |
| 4,853,602 A | 8/1989 | Hommes et al. |
| 4,873,677 A | 10/1989 | Sakamoto et al. |
| 4,890,023 A | 12/1989 | Hinds et al. |
| 4,892,980 A | 1/1990 | Riley |
| 4,893,071 A | 1/1990 | Miller |
| 4,906,909 A | 3/1990 | Gremillion et al. |
| 4,912,746 A | 3/1990 | Oishi |
| 4,914,539 A | 4/1990 | Turner et al. |
| 4,920,318 A | 4/1990 | Misic et al. |
| 4,953,470 A | 9/1990 | Yamaguchi |
| 4,955,303 A | 9/1990 | Ikeda |
| 4,972,779 A | 11/1990 | Morishita et al. |
| 4,982,556 A | 1/1991 | Tisma |
| 5,001,479 A | 3/1991 | Becker et al. |
| 5,003,260 A | 3/1991 | Auchterlonie |
| 5,014,625 A | 5/1991 | Murai et al. |
| 5,021,778 A | 6/1991 | Walton |
| 5,023,495 A | 6/1991 | Ohsaka et al. |
| 5,032,746 A | 7/1991 | Ueda et al. |
| 5,032,747 A | 7/1991 | Sakamoto et al. |
| 5,036,262 A | 7/1991 | Schonbach |
| 5,047,676 A | 9/1991 | Ichikawa |
| 5,051,225 A | 9/1991 | Hommes et al. |
| 5,053,654 A | 10/1991 | Augsburger et al. |
| 5,055,775 A | 10/1991 | Scherz et al. |
| 5,072,144 A | 12/1991 | Saito et al. |
| 5,072,493 A | 12/1991 | Hommes et al. |
| 5,091,665 A | 2/1992 | Kelly |
| 5,092,450 A | 3/1992 | Schommartz et al. |
| 5,093,590 A | 3/1992 | Murai et al. |
| 5,094,172 A | 3/1992 | Kummer |
| 5,108,052 A | 4/1992 | Malewicki et al. |
| 5,121,830 A | 6/1992 | Sakamoto et al. |
| 5,125,347 A | 6/1992 | Takahashi et al. |
| 5,126,606 A | 6/1992 | Hofmann et al. |
| 5,126,648 A | 6/1992 | Jacobs |
| 5,136,217 A | 8/1992 | Hoffmann et al. |
| 5,152,227 A | 10/1992 | Kato et al. |
| 5,156,092 A | 10/1992 | Hirtz |
| 5,161,758 A | 11/1992 | Shuto et al. |
| 5,165,527 A | 11/1992 | Garbagnati |
| 5,175,976 A | 1/1993 | Petry et al. |
| 5,178,037 A | 1/1993 | Mihirogi et al. |
| 5,180,041 A | 1/1993 | Shuto et al. |
| 5,185,984 A | 2/1993 | Tisma |
| 5,193,767 A | 3/1993 | Mihirogi et al. |
| 5,197,391 A | 3/1993 | Shimada et al. |
| 5,199,674 A | 4/1993 | Mihirogi et al. |
| 5,205,395 A | 4/1993 | Bruno et al. |
| 5,214,323 A | 5/1993 | Ueda et al. |
| 5,214,981 A | 6/1993 | Weinberger et al. |
| 5,225,024 A | 7/1993 | Hanley et al. |
| 5,225,725 A | 7/1993 | Shiraki et al. |
| 5,225,726 A | 7/1993 | Tozoni |
| 5,229,669 A | 7/1993 | Takei et al. |
| 5,237,252 A | 8/1993 | Tanaka et al. |
| 5,242,136 A | 9/1993 | Cribbens et al. |
| 5,247,890 A | 9/1993 | Mihirogi et al. |
| 5,251,563 A | 10/1993 | Staehs et al. |
| 5,263,670 A | 11/1993 | Colbaugh et al. |
| 5,267,514 A | 12/1993 | Staehs et al. |
| 5,277,124 A | 1/1994 | DiFonso et al. |
| 5,277,125 A | 1/1994 | DiFonso et al. |
| 5,277,285 A | 1/1994 | Musachio |
| 5,282,424 A | 2/1994 | O'Neill |
| 5,289,088 A | 2/1994 | Andoh et al. |
| 5,293,308 A | 3/1994 | Boys et al. |
| 5,317,245 A | 5/1994 | Moritz et al. |
| 5,325,974 A | 7/1994 | Staehs |
| 5,347,456 A | 9/1994 | Zhang et al. |
| 5,361,707 A | 11/1994 | Fujie et al. |
| 5,362,222 A | 11/1994 | Faig et al. |
| 5,368,425 A | 11/1994 | Mills et al. |
| 5,370,059 A | 12/1994 | Raschbichler et al. |
| 5,400,668 A | 3/1995 | Hattori et al. |
| 5,409,095 A | 4/1995 | Hoshi et al. |
| 5,409,356 A | 4/1995 | Massie |
| 5,412,317 A | 5/1995 | Kyoizumi |
| 5,433,155 A | 7/1995 | O'Neill et al. |
| 5,435,429 A | 7/1995 | Van Den Goor et al. |
| 5,444,341 A | 8/1995 | Kneifel, II et al. |
| 5,450,305 A | 9/1995 | Boys et al. |
| 5,452,201 A | 9/1995 | Pieronek et al. |
| 5,452,663 A | 9/1995 | Berdut et al. |
| 5,458,047 A | 10/1995 | McCormick |
| 5,467,718 A | 11/1995 | Shibata et al. |
| 5,497,038 A | 3/1996 | Sink |
| 5,502,383 A | 3/1996 | Funami et al. |
| 5,517,924 A | 5/1996 | He et al. |
| 5,519,266 A | 5/1996 | Chitayat |
| 5,521,444 A | 5/1996 | Foreman |
| 5,521,451 A | 5/1996 | Oudet et al. |
| 5,523,637 A | 6/1996 | Miller |
| 5,528,113 A | 6/1996 | Boys et al. |
| 5,542,356 A | 8/1996 | Richert et al. |
| 5,551,350 A | 9/1996 | Yamada et al. |
| 5,552,689 A | 9/1996 | Matoba |
| 5,560,476 A | 10/1996 | Lee |
| 5,565,718 A | 10/1996 | Takei |
| 5,573,090 A | 11/1996 | Ross |
| 5,590,278 A | 12/1996 | Barthel et al. |
| 5,590,281 A | 12/1996 | Stevens |
| 5,590,604 A | 1/1997 | Lund |
| 5,590,995 A | 1/1997 | Berkers et al. |
| 5,592,158 A | 1/1997 | Riffaud et al. |
| 5,595,121 A | 1/1997 | Elliott et al. |
| 5,605,100 A | 2/1997 | Morris et al. |
| 5,606,256 A | 2/1997 | Takei |
| 5,619,078 A | 4/1997 | Boys et al. |
| 5,628,252 A | 5/1997 | Kuznetsov |
| 5,642,013 A | 6/1997 | Wavre |
| 5,644,176 A | 7/1997 | Katagiri et al. |
| 5,653,173 A | 8/1997 | Fischer |
| 5,668,421 A | 9/1997 | Gladish et al. |
| 5,669,310 A | 9/1997 | Powell et al. |
| 5,669,470 A | 9/1997 | Ross |
| 5,684,344 A | 11/1997 | Takei |
| 5,689,164 A | 11/1997 | Hoft et al. |
| 5,689,994 A | 11/1997 | Nagai et al. |
| 5,701,042 A | 12/1997 | Takei et al. |
| 5,703,417 A | 12/1997 | Kelly |
| 5,708,427 A | 1/1998 | Bush |
| 5,709,291 A | 1/1998 | Nishino et al. |
| 5,712,514 A | 1/1998 | Fischperer et al. |
| 5,715,657 A | 2/1998 | Mondani et al. |
| 5,720,454 A | 2/1998 | Bachetti et al. |
| 5,722,326 A | 3/1998 | Post |
| 5,723,917 A | 3/1998 | Chitayat |
| 5,729,251 A | 3/1998 | Nakashima |

(56) References Cited

U.S. PATENT DOCUMENTS

| | | |
|---|---|---|
| 5,757,091 A | 5/1998 | Sogabe et al. |
| 5,757,100 A | 5/1998 | Burgbacher et al. |
| 5,757,288 A | 5/1998 | Dixon et al. |
| 5,763,966 A | 6/1998 | Hinds |
| 5,768,856 A | 6/1998 | Odenthal |
| 5,770,936 A | 6/1998 | Hirai et al. |
| 5,773,941 A | 6/1998 | Moritz et al. |
| 5,789,892 A | 8/1998 | Takei |
| 5,793,128 A | 8/1998 | Nanba et al. |
| 5,810,153 A | 9/1998 | Zimmerman et al. |
| 5,821,638 A | 10/1998 | Boys et al. |
| 5,828,142 A | 10/1998 | Simpson |
| 5,831,352 A | 11/1998 | Takei |
| 5,839,554 A | 11/1998 | Clark et al. |
| 5,839,567 A | 11/1998 | Kyotani et al. |
| 5,845,581 A | 12/1998 | Svensson |
| 5,896,031 A | 4/1999 | King |
| 5,898,579 A | 4/1999 | Boys et al. |
| 5,900,728 A | 5/1999 | Moser et al. |
| 5,904,101 A | 5/1999 | Kuznetsov |
| 5,906,647 A | 5/1999 | Zyburt et al. |
| 5,907,200 A | 5/1999 | Chitayat |
| 5,910,691 A | 6/1999 | Wavre et al. |
| 5,920,164 A | 7/1999 | Moritz et al. |
| 5,925,943 A | 7/1999 | Chitayat |
| 5,925,956 A | 7/1999 | Ohzeki |
| 5,927,657 A | 7/1999 | Takasan et al. |
| 5,929,541 A | 7/1999 | Naito et al. |
| 5,936,319 A | 8/1999 | Chitayat |
| 5,938,577 A | 8/1999 | Lindem |
| 5,939,845 A | 8/1999 | Hommes |
| 5,942,817 A | 8/1999 | Chitayat |
| 5,947,361 A | 9/1999 | Berger et al. |
| 5,950,543 A | 9/1999 | Oster |
| 5,952,742 A | 9/1999 | Stoiber et al. |
| 5,952,743 A | 9/1999 | Sidey et al. |
| 5,962,937 A | 10/1999 | Wavre |
| 5,965,963 A | 10/1999 | Chitayat |
| 5,977,664 A | 11/1999 | Chitayat |
| 5,990,592 A | 11/1999 | Miura et al. |
| 5,994,798 A | 11/1999 | Chitayat |
| 5,998,989 A | 12/1999 | Lohberg |
| 6,005,310 A | 12/1999 | Mosciatti et al. |
| 6,005,511 A | 12/1999 | Young et al. |
| 6,008,552 A | 12/1999 | Yagoto et al. |
| 6,011,508 A | 1/2000 | Perreault et al. |
| 6,016,044 A | 1/2000 | Holdaway |
| 6,025,659 A | 2/2000 | Nashiki |
| 6,032,110 A | 2/2000 | Ishihara et al. |
| 6,034,499 A | 3/2000 | Tranovich |
| 6,044,770 A | 4/2000 | Davey et al. |
| 6,064,301 A | 5/2000 | Takahashi et al. |
| 6,075,297 A | 6/2000 | Izawa et al. |
| 6,078,114 A | 6/2000 | Bessette et al. |
| 6,081,058 A | 6/2000 | Suzuki et al. |
| 6,085,496 A | 7/2000 | Fontanazzi et al. |
| 6,087,742 A | 7/2000 | Maestre |
| 6,089,512 A | 7/2000 | Ansorge et al. |
| 6,100,663 A | 8/2000 | Boys et al. |
| 6,100,821 A | 8/2000 | Tanji et al. |
| 6,101,952 A | 8/2000 | Thornton et al. |
| 6,104,117 A | 8/2000 | Nakamura et al. |
| 6,105,338 A | 8/2000 | Kalany et al. |
| 6,114,825 A | 9/2000 | Katz |
| 6,118,249 A | 9/2000 | Brockmann et al. |
| 6,137,424 A | 10/2000 | Cohen et al. |
| 6,147,421 A | 11/2000 | Takita et al. |
| 6,175,169 B1 | 1/2001 | Hollis, Jr. et al. |
| 6,191,507 B1 | 2/2001 | Peltier et al. |
| 6,193,199 B1 | 2/2001 | Karam, II |
| 6,202,392 B1 | 3/2001 | Greenwell et al. |
| 6,220,424 B1 | 4/2001 | Fluck |
| 6,225,919 B1 | 5/2001 | Lumbis et al. |
| 6,236,124 B1 | 5/2001 | Sekiyama et al. |
| 6,242,822 B1 | 6/2001 | Strothmann et al. |
| 6,257,604 B1 | 7/2001 | Laurent et al. |
| 6,274,952 B1 | 8/2001 | Chitayat |
| 6,285,988 B1 | 9/2001 | Nogami |
| 6,286,290 B1 | 9/2001 | Fluck |
| 6,286,434 B1 | 9/2001 | Fischperer et al. |
| 6,297,610 B1 | 10/2001 | Bauer et al. |
| 6,307,766 B1 | 10/2001 | Ross et al. |
| 6,315,108 B1 | 11/2001 | Bootsman et al. |
| 6,317,338 B1 | 11/2001 | Boys et al. |
| 6,326,708 B1 | 12/2001 | Tsuboi et al. |
| 6,326,713 B1 | 12/2001 | Judson |
| 6,376,957 B1 | 4/2002 | Haydock et al. |
| 6,397,755 B1 | 6/2002 | Kamler |
| 6,397,990 B1 | 6/2002 | Brien et al. |
| 6,400,278 B1 | 6/2002 | Weyerstall et al. |
| 6,414,742 B1 | 7/2002 | Korenaga et al. |
| 6,417,584 B1 | 7/2002 | Chitayat |
| 6,417,914 B1 | 7/2002 | Li |
| 6,418,857 B1 | 7/2002 | Okano et al. |
| 6,421,984 B1 | 7/2002 | Murgatroyd et al. |
| 6,445,093 B1 | 9/2002 | Binnard |
| 6,455,957 B1 | 9/2002 | Chitayat |
| 6,483,202 B1 | 11/2002 | Boys |
| 6,495,941 B1 | 12/2002 | Nishimura et al. |
| 6,499,701 B1 | 12/2002 | Thornton et al. |
| 6,534,894 B1 | 3/2003 | Flowerday |
| 6,578,495 B1 | 6/2003 | Yitts et al. |
| 6,580,185 B2 | 6/2003 | Kang et al. |
| 6,619,212 B1 | 9/2003 | Stephan et al. |
| 6,621,183 B1 | 9/2003 | Boys |
| 6,625,517 B1 | 9/2003 | Bogdanov et al. |
| 6,637,343 B2 | 10/2003 | Stephan et al. |
| 6,644,176 B2 | 11/2003 | Prip |
| 6,646,721 B2 | 11/2003 | Compter et al. |
| 6,650,079 B2 | 11/2003 | Binnard |
| 6,651,566 B2 | 11/2003 | Stephan et al. |
| 6,684,794 B2 | 2/2004 | Fiske et al. |
| 6,686,823 B2 | 2/2004 | Amtz et al. |
| 6,703,806 B2 | 3/2004 | Joong et al. |
| 6,713,902 B2 | 3/2004 | Chitayat |
| 6,715,598 B2 | 4/2004 | Affaticati et al. |
| 6,718,197 B1 | 4/2004 | Carlson et al. |
| 6,781,524 B1 | 8/2004 | Clark et al. |
| 6,784,572 B1 | 8/2004 | Backman et al. |
| 6,788,385 B2 | 9/2004 | Tanaka et al. |
| 6,803,681 B2 | 10/2004 | Faizullabhoy et al. |
| 6,803,744 B1 | 10/2004 | Sabo |
| 6,834,595 B1 | 12/2004 | Henderson |
| 6,857,374 B2 | 2/2005 | Novacek |
| 6,875,107 B1 | 4/2005 | Luciano, Jr. |
| 6,876,105 B1 | 4/2005 | Faizullabhoy et al. |
| 6,876,107 B2 | 4/2005 | Jacobs |
| 6,876,896 B1 | 4/2005 | Ortiz et al. |
| 6,899,037 B1 | 5/2005 | Cowan, Jr. |
| 6,910,568 B1 | 6/2005 | Ydoate et al. |
| 6,911,747 B2 | 6/2005 | Tsuboi et al. |
| 6,917,136 B2 | 7/2005 | Thornton et al. |
| 6,930,413 B2 | 8/2005 | Marzano |
| 6,963,148 B1 | 11/2005 | Faizullabhoy et al. |
| 6,975,081 B1 | 12/2005 | Faizullabhoy et al. |
| 6,983,701 B2 | 1/2006 | Thornton et al. |
| 7,009,683 B2 | 3/2006 | Sato et al. |
| 7,019,818 B2 | 3/2006 | Opower et al. |
| 7,026,732 B1 | 4/2006 | Backman et al. |
| 7,134,258 B2 | 11/2006 | Kalany et al. |
| 7,170,241 B1 | 1/2007 | Faizullabhoy et al. |
| RE39,747 E | 7/2007 | Peltier et al. |
| 7,243,752 B2 | 7/2007 | Green et al. |
| 7,262,523 B1 | 8/2007 | Faizullabhoy et al. |
| 7,432,622 B2 | 10/2008 | Griepentrog et al. |
| 7,448,327 B2 | 11/2008 | Thornton et al. |
| 7,456,529 B2 | 11/2008 | Faizullabhoy et al. |
| 7,456,593 B1 | 11/2008 | Floresta et al. |
| 7,458,454 B2 | 12/2008 | Mendenhall |
| 7,511,250 B2 | 3/2009 | Lindig |
| 7,525,283 B2 | 4/2009 | Cheng et al. |
| 7,538,469 B2 | 5/2009 | Thornton et al. |
| 7,554,316 B2 | 6/2009 | Stevens et al. |
| 7,602,142 B2 | 10/2009 | Weber et al. |

(56) References Cited

U.S. PATENT DOCUMENTS

| | | | |
|---|---|---|---|
| 7,605,496 B2 | 10/2009 | Stevens et al. | |
| 7,633,235 B2 | 12/2009 | Boys | |
| 7,714,537 B2 | 5/2010 | Cheng et al. | |
| 7,781,993 B1 | 8/2010 | Faizullabhoy et al. | |
| 7,825,537 B2 | 11/2010 | Freer | |
| 7,859,139 B2 | 12/2010 | Jacobs | |
| 7,863,861 B2 | 1/2011 | Cheng et al. | |
| 7,868,587 B2 | 1/2011 | Stevens et al. | |
| 7,913,606 B2 | 3/2011 | Schneider et al. | |
| 7,926,644 B2 | 4/2011 | Mendenhall | |
| 7,932,798 B2 | 4/2011 | Tolle et al. | |
| 7,952,322 B2 | 5/2011 | Partovi et al. | |
| 7,952,324 B2 | 5/2011 | Cheng et al. | |
| 8,074,578 B2 | 12/2011 | Thornton | |
| 8,076,803 B2 | 12/2011 | Jacobs | |
| 8,113,310 B2 | 2/2012 | Gurol et al. | |
| 8,502,422 B2 | 8/2013 | Lykkegaard | |
| 8,616,134 B2 * | 12/2013 | King | B60L 13/003 104/284 |
| 8,863,669 B2 | 10/2014 | Young et al. | |
| 8,967,051 B2 | 3/2015 | King et al. | |
| 9,032,880 B2 | 5/2015 | King et al. | |
| 2001/0045526 A1 | 11/2001 | Itoh et al. | |
| 2002/0024979 A1 | 2/2002 | Vilhelmsson et al. | |
| 2002/0047315 A1 | 4/2002 | Chitayat | |
| 2002/0089237 A1 | 7/2002 | Hazelton | |
| 2002/0093252 A1 | 7/2002 | Kang et al. | |
| 2002/0149272 A1 | 10/2002 | Chitayat | |
| 2002/0180279 A1 | 12/2002 | Faizullabhoy et al. | |
| 2002/0185919 A1 | 12/2002 | Botos et al. | |
| 2003/0025403 A1 | 2/2003 | Hsiao | |
| 2003/0107289 A1 | 6/2003 | Thornton et al. | |
| 2003/0136086 A1 | 7/2003 | Kalany et al. | |
| 2003/0217668 A1 | 11/2003 | Fiske et al. | |
| 2003/0230941 A1 | 12/2003 | Jacobs | |
| 2004/0119358 A1 | 6/2004 | Thornton et al. | |
| 2005/0172850 A1 | 8/2005 | Sakita | |
| 2005/0225188 A1 | 10/2005 | Griepentrog et al. | |
| 2005/0242675 A1 | 11/2005 | Thornton et al. | |
| 2005/0263369 A1 | 12/2005 | Mendenhall | |
| 2006/0130699 A1 | 6/2006 | Thornton et al. | |
| 2006/0201376 A1 | 9/2006 | Brigham | |
| 2007/0044676 A1 | 3/2007 | Clark et al. | |
| 2007/0283841 A1 | 12/2007 | Lopatinsky et al. | |
| 2008/0006172 A1 | 1/2008 | Thornton | |
| 2008/0148990 A1 | 6/2008 | Wamble et al. | |
| 2009/0107806 A1 | 4/2009 | Mendenhall | |
| 2010/0054897 A1 | 3/2010 | Bufano et al. | |
| 2010/0186618 A1 | 7/2010 | King et al. | |
| 2010/0192799 A1 | 8/2010 | Miller | |
| 2010/0200316 A1 | 8/2010 | Gurol et al. | |
| 2010/0236445 A1 | 9/2010 | King et al. | |
| 2011/0125350 A1 | 5/2011 | Won et al. | |
| 2013/0008336 A1 | 1/2013 | Young et al. | |
| 2013/0074724 A1 | 3/2013 | King et al. | |
| 2014/0182478 A1 | 7/2014 | King et al. | |
| 2015/0083018 A1 | 3/2015 | Clark et al. | |
| 2015/0360581 A1 | 12/2015 | King et al. | |

FOREIGN PATENT DOCUMENTS

| | | |
|---|---|---|
| CN | 1194735 A | 9/1998 |
| CN | 1258029 A | 6/2000 |
| CN | 1349463 A | 5/2002 |
| CN | 1451148 A | 10/2003 |
| CN | 1575538 A | 2/2005 |
| CN | 1703817 A | 11/2005 |
| CN | 1906829 A | 1/2007 |
| CN | 1970410 A | 5/2007 |
| CN | 100372215 C | 2/2008 |
| CN | 101356714 A | 1/2009 |
| CN | 101378931 A | 3/2009 |
| CN | 101489849 A | 7/2009 |
| CN | 101574933 A | 11/2009 |
| CN | 102387973 A | 3/2012 |
| CN | 101083419 B | 3/2013 |
| CN | 103717440 A | 4/2014 |
| DE | 365896 C | 12/1922 |
| DE | 1 921 714 U | 8/1965 |
| DE | 1 921 714 A1 | 2/1970 |
| DE | 1 963 505 A1 | 7/1970 |
| DE | 2 001 330 A1 | 11/1970 |
| DE | 2 024 519 A1 | 12/1971 |
| DE | 2 140 829 A1 | 2/1973 |
| DE | 24 36 466 A1 | 2/1976 |
| DE | 24 45 440 A1 | 4/1976 |
| DE | 25 32 269 A1 | 2/1977 |
| DE | 25 42 805 A1 | 4/1977 |
| DE | 26 13 105 A1 | 9/1977 |
| DE | 26 36 466 A1 | 2/1978 |
| DE | 26 59 010 A1 | 6/1978 |
| DE | 27 10 156 A1 | 9/1978 |
| DE | 27 58 075 A1 | 7/1979 |
| DE | 26 13 105 C3 | 10/1980 |
| DE | 26 59 010 B2 | 10/1980 |
| DE | 26 59 010 C3 | 11/1983 |
| DE | 33 41 787 A1 | 5/1984 |
| DE | 38 33 904 A1 | 4/1990 |
| DE | 41 14 706 C1 | 10/1992 |
| DE | 195 35 856 A1 | 3/1997 |
| DE | 197 17 662 A1 | 10/1998 |
| DE | 298 16 285 U1 | 1/2000 |
| DE | 100 00 513 C1 | 9/2001 |
| EP | 0 093 948 A1 | 11/1983 |
| EP | 0 132 934 A2 | 2/1985 |
| EP | 0 179 188 A2 | 4/1986 |
| EP | 0 229 669 A2 | 7/1987 |
| EP | 0 400 663 A1 | 12/1990 |
| EP | 0 482 424 A1 | 4/1992 |
| EP | 0 593 910 A1 | 4/1994 |
| EP | 0 400 663 B1 | 8/1994 |
| EP | 0 612 446 A1 | 8/1994 |
| EP | 0 455 632 B1 | 10/1994 |
| EP | 0 612 446 B1 | 9/1995 |
| EP | 0 482 424 B1 | 1/1996 |
| EP | 0 695 703 A1 | 2/1996 |
| EP | 0 740 405 A1 | 10/1996 |
| EP | 0 816 201 A1 | 1/1998 |
| EP | 0 820 862 A2 | 1/1998 |
| EP | 0 939 482 A2 | 9/1999 |
| EP | 0 939 483 A2 | 9/1999 |
| EP | 0 939 484 A1 | 9/1999 |
| EP | 1 042 152 A4 | 3/2001 |
| EP | 0 754 366 B1 | 6/2002 |
| EP | 1 232 974 A1 | 8/2002 |
| EP | 1 015 851 B1 | 11/2002 |
| EP | 1 270 311 A2 | 1/2003 |
| EP | 1 270 312 A1 | 1/2003 |
| EP | 1 283 586 A1 | 2/2003 |
| EP | 0 939 299 B1 | 5/2003 |
| EP | 1 418 128 A1 | 5/2004 |
| EP | 0 939 482 B1 | 2/2005 |
| EP | 1 748 943 A4 | 7/2009 |
| EP | 2 131 484 A1 | 12/2009 |
| EP | 2 182 628 A1 | 5/2010 |
| EP | 1 845 428 B1 | 7/2013 |
| EP | 2 747 257 A2 | 6/2014 |
| FR | 433108 A | 12/1911 |
| FR | 2 168 418 A1 | 8/1973 |
| GB | 1 170 761 A | 11/1969 |
| GB | 1 247 257 A | 9/1971 |
| GB | 1 390 375 A | 4/1975 |
| GB | 1 404 648 A | 9/1975 |
| GB | 1 418 128 A | 12/1975 |
| GB | 2 260 743 A | 4/1993 |
| JP | 54-053412 A | 4/1979 |
| JP | 56-166763 A | 12/1981 |
| JP | 57-000068 A | 1/1982 |
| JP | 59-080190 A | 5/1984 |
| JP | 59-153457 A | 9/1984 |
| JP | 60-207666 A | 10/1985 |
| JP | 62-178104 A | 8/1987 |
| JP | 62-290385 A | 12/1987 |

(56) References Cited

FOREIGN PATENT DOCUMENTS

| | | |
|---|---|---|
| JP | 01-136504 A | 5/1989 |
| JP | 01-164205 A | 6/1989 |
| JP | 03-007003 A | 1/1991 |
| JP | 03-029747 A | 2/1991 |
| JP | 03-045105 A | 2/1991 |
| JP | 03-074109 A | 3/1991 |
| JP | 03-097380 U | 10/1991 |
| JP | 04-131198 U | 12/1992 |
| JP | 05-153764 A | 6/1993 |
| JP | 05-165521 A | 7/1993 |
| JP | 05-219786 A | 8/1993 |
| JP | 05-254660 A | 10/1993 |
| JP | 06-020766 A | 1/1994 |
| JP | 06-165313 A | 6/1994 |
| JP | 06-323803 A | 11/1994 |
| JP | 07-087618 A | 3/1995 |
| JP | 07-193914 A | 7/1995 |
| JP | 07-322596 A | 12/1995 |
| JP | 08-129336 A | 5/1996 |
| JP | 08-205514 A | 8/1996 |
| JP | 08-239121 A | 9/1996 |
| JP | 09-051688 A | 2/1997 |
| JP | 09-322518 A | 12/1997 |
| JP | 11-073600 A | 3/1999 |
| JP | 11-122902 A | 4/1999 |
| JP | 11-127505 A | 5/1999 |
| JP | 11-136504 A | 5/1999 |
| JP | 11-299010 A | 10/1999 |
| JP | 11-341785 A | 12/1999 |
| JP | 2001-008312 A | 1/2001 |
| JP | 2002-058271 A | 2/2002 |
| JP | 2003-339182 A | 11/2003 |
| JP | 2004-112864 A | 4/2004 |
| JP | 4082550 B2 | 4/2008 |
| JP | 4082551 B2 | 4/2008 |
| JP | 4082552 B2 | 4/2008 |
| JP | 4082553 B2 | 4/2008 |
| JP | 4082554 B2 | 4/2008 |
| JP | 4082555 B2 | 4/2008 |
| JP | 4082556 B2 | 4/2008 |
| JP | 4082557 B2 | 4/2008 |
| JP | 4082558 B2 | 4/2008 |
| JP | 4082559 B2 | 4/2008 |
| KR | 2003-0006756 A | 1/2003 |
| KR | 2003-0013868 A | 2/2003 |
| KR | 2003-0047877 A | 6/2003 |
| KR | 2003-0057995 A | 7/2003 |
| KR | 10-2005-0059230 A | 6/2005 |
| KR | 10-2007-0011577 A | 1/2007 |
| KR | 10-2008-0033440 A | 4/2008 |
| KR | 10-0864990 B1 | 10/2008 |
| KR | 10-0914927 B1 | 8/2009 |
| KR | 10-1004511 B1 | 12/2010 |
| KR | 10-2012-0027110 A | 3/2012 |
| KR | 10-2014-0038505 A | 3/2014 |
| SU | 1140212 A1 | 2/1985 |
| WO | 89/05542 A1 | 6/1989 |
| WO | 93/10594 A1 | 5/1993 |
| WO | 94/04404 A1 | 3/1994 |
| WO | 95/17680 A1 | 6/1995 |
| WO | 95/21405 A2 | 8/1995 |
| WO | 96/00958 A1 | 1/1996 |
| WO | 96/27544 A1 | 9/1996 |
| WO | 98/47734 A1 | 10/1998 |
| WO | 98/50760 A2 | 11/1998 |
| WO | 00/64742 A2 | 11/2000 |
| WO | 00/64751 A1 | 11/2000 |
| WO | 00/64753 A1 | 11/2000 |
| WO | 00/64791 A1 | 11/2000 |
| WO | 00/71402 A1 | 11/2000 |
| WO | 00/75603 A1 | 12/2000 |
| WO | 01/85581 A1 | 11/2001 |
| WO | 01/96139 A2 | 12/2001 |
| WO | 03/029651 A2 | 4/2003 |
| WO | 03/052900 A2 | 6/2003 |
| WO | 03/105324 A1 | 12/2003 |
| WO | 2004/018276 A2 | 3/2004 |
| WO | 2005/110898 A2 | 11/2005 |
| WO | 2007/021206 A1 | 2/2007 |
| WO | 2007/108586 A1 | 9/2007 |
| WO | 2009/015249 A2 | 1/2009 |
| WO | 2010/085670 A1 | 7/2010 |
| WO | 2010/098935 A2 | 9/2010 |
| WO | 2010/114656 A1 | 10/2010 |
| WO | 2012/170636 A1 | 12/2012 |
| WO | 2015/036302 A1 | 3/2015 |

OTHER PUBLICATIONS

U.S. Appl. No. 12/259,928, filed Oct. 28, 2008 Three-Dimensional Motion Using Single-Pathway Based Actuators.
U.S. Appl. No. 12/359,022, filed Jan. 23, 2009 Transport System Powered by Short Block Linear Synchronous Motors.
U.S. Appl. No. 12/692,441, filed Jan. 22, 2010 Transport System Powered by Short Block Linear Synchronous Motors and Switching Mechanism.
U.S. Appl. No. 13/490,995, filed Jun. 7, 2012 Versatile Control of a Linear Synchronous Motor Propulsion System.
U.S. Appl. No. 13/623,124, filed Sep. 20, 2012 Transport System Powered by Short Block Linear Synchronous Motors and Switching Mechanism.
U.S. Appl. No. 14/143,802, filed Dec. 30, 2013 Transport System Powered by Short Block Linear Synchronous Motors.
U.S. Appl. No. 14/491,274, filed Sep. 19, 2014 Linear Motor Transport for Packaging and Other Uses.
U.S. Appl. No. 14/637,201, filed Mar. 3, 2015 Transport System Powered by Short Block Linear Synchronous Motors and Switching Mechanism.
U.S. Appl. No. 14/688,737, filed Apr. 16, 2015 Short Block Linear Synchronous Motors and Switching Mechanisms.
[No Author Listed] Encoder Application Handbook. Danaher Industrial Controls, 2003, 16 pages.
[No Author Listed] Magnetic Levitation Space Propulsion. NASA. Florida Space Institute. University of Central Florida. 2012, 38 pages.
[No Author Listed] Motors. Power Transmission Design. 1997, pp. A317, and A332-A342.
[No Author Listed] Safety of High Speed Magnetic Levitation Transportation Systems. High-Speed Maglev Trains; German Safety Requirements. US Department of Transportation. Office of Research and Development. Jan. 1992, Edition 1, 288 pages. DOT/FRA/ORD-92/01.
Ackermann, B., et al., New technique for reducing cogging torque in a class of brushless DC motors. IEE Proceedings B (Electric Power Applications), vol. 139, Issue 4, Jul. 1992, p. 315-320.
Basak, A., Permanent-Magnet DC Linear Motors. Monographs in Electrical Engineering (Book 40). Clarendo Press, Oxford, 1996, pp. 21-41; 90-104.
Breton, C., et al., Influence of machine symmetry on reduction of cogging torque in permanent-magnet brushless motors. IEEE Transactions on Magnetics, Sep. 2000, vol. 36, Issue 5, pp. 3819-3823.
Chinese Office Action for Application No. 2010800131883, dated Mar. 7, 2013(7 pages) with partial English summary.
Chinese Office Action for Application No. 201280038156.8 dated Jun. 19, 2015 (18 pages).
Chinese Office Action for Application No. 201410638502.7, dated Mar. 2, 2016 (40 pages).
Clark, T. M., Position sensing and control of a linear synchronous motor. Department of Electrical Engineering and Computer Science, Massachusetts Institute of Technology. Thesis towards Doctor of Science Requirements. May 26, 1995, 159 pages.
Duffie, N.A., et al., Distributed system-level control of vehicles in a high-performance material transfer system. IEEE Transactions on Control Systems Technology, vol. 3, No. 2, Jun. 1995, pp. 212-217.
Eghtesadi, M., Inductive power transfer to an electric vehicle-analytical model. 40th IEEE Vehicular Technology Conference, May 6-9, 1990, Orlando, FL, pp. 100-104.

(56) References Cited

OTHER PUBLICATIONS

Elliot, Novel Application of a Linear Synchoronous Motor Drive. Cegelec Projects Ltd. IEE. 1997. 5 pages.
Extended European Search Report for Application No. 12797648.8, dated Feb. 15, 2016 (7 pages).
Extended European Search Report for Application No. 13839639.5, dated Apr. 20, 2016 (7 pages).
Gieras, J.F., et al., Building and factory transportation systems. Linear Synchronous Motors: Transportation and Automation Systems. CRC Press, Boca Raton, FL, 2000, Chapter 7, pp. 217-251.
Gieras, J.F., et al., High speed maglev transport. Linear Synchronous Motors: Transportation and Automation Systems. CRC Press, Boca Raton, FL, 2000, Chapter 6, pp. 177-215.
Gieras, J.F., et al., Materials and construction. Linear Synchronous Motors: Transportation and Automation Systems. CRC Press, Boca Raton, FL, 2000, Chapter 2, pp. 43-84.
Gieras, J.F., et al., Topology and selection. Linear Synchronous Motors: Transportation and Automation Systems. CRC Press, Boca Raton, FL, 2000, Chapter 1, pp. 1-42.
Hanselman, D., Ph.D., Brushless Permanent Magnet Motor Design. Second Edition. Magna Physics Publishing, Lebanon, OH, 2006, pp. 209-219.
He, J.L., et al., Survey of Foreign Maglev Systems. Center for Transportation Research, Energy Systems Dvision, Argonne National Laboratory, Argonne, IL, Jul. 1992, 88 pages.
Hendershot, J.R., et al., eds., Design of Brushless Permanent-Magnet Motors (Monographs in Electrical and Electronic Engineering). Oxford University Press, 1995, pp. 3-48-3-67 and 5-28-5-29.
Hor, P.J., et al., Minimization of cogging force in a linear permanent magnet motor. IEEE Transaction on Magnetics, Sep. 1998, vol. 34, issue 5, pp. 3544-3547.
Hughes, A., Synchronous, switched, reluctance and brushless D.C. drives. Ch. 9, 2nd edition. Electric Motors and Drives: Fundamentals, Types and Applications. Butterworth-Heinemann Ltd., 1993, pp. 292-315.
Hugli, S. MagneTrak, Test Specification. Project-No. 133844. Rolex Industries SA. Oct. 18, 2010, 28 pages.
Hwang, S.M., et al., Various design techniques to reduce cogging torque by controlling energy variation in permanent magnet motors. IEEE Transactions on Magnetics, Jul. 2001, vol. 37, issue 4, pp. 2806-2809.
International Search Report for Application No. PCT/US03/30970, dated Aug. 11, 2004 (3 pages).
International Search Report and Written Opinion for Application No. PCT/US05/15780, dated Nov. 26, 2007 (10 pages).
International Search Report & Written Opinion, Application No. PCT/US2010/21839, dated Mar. 26, 2010. (15 Pages).
International Search Report and Written Opinion dated Aug. 6, 2012 for Application No. PCT/US2012/041263 (13 Pages).
International Preliminary Report on Patentability dated Dec. 27, 2013 for Application No. PCT/US2012/041263 (8 Pages).
International Search Report and Written Opinion for Application No. PCT/US2013/060286 dated Feb. 18, 2014 (15 Pages).
International Search Report and Written Opinion for Application No. PCT/US2014/056574, dated Dec. 29, 2014 (17 pages).
Third Party Observation for International Application No. PCT/US2014/056574, dated Jan. 21, 2016 (3 pages).
Japanese Office Action for Application No. 2011-548142 dated Jan. 21, 2014 (11 Pages).
Japanese Office Action for Application No. 2011-548142 dated Jan. 6, 2015 (7 Pages).
Koh, et al., New cogging-torque reduction method for brushless permanent-magnet motors. IEEE Transactions on Magnetics, Nov. 2003, vol. 39, issue 6, pp. 3503-3506.
Li, T., et al., Reduction of cogging torque in permanent magnet motors. IEEE Transactions on Magnetics, Nov. 1988, vol. 24, issue 6, pp. 2901-2903.
Phillips, W.D., Signals. Design Electronics. DOCTRONICS Education Publications, 1998, 12 pages. Retrieved from <www.doctronics.co.uk/signals.htm>.
Rhoney, B. et al., Principles of AC, DC, Linear, Step, and Servo Motors. MAE 789 C. May 8, 2000, 23 pages.
Sands, B.D., The Transrapid Magnetic Levitation System: A Technical and Commercial Assessment. California High Speed Rail Series. University of California Transportation Center, University of California at Berkeley, Mar. 1992, 49 pages.
Strathdee, M., Fledgling Waterloo firm a partner with ATS in parts handling system. Oct. 8, 1998, The Toronto Star Achive, 2 pages. Retrieved on Oct. 14, 2010 from <http://pqasb.pqarchiver.com/thestar>.
Taniguchi, M., High Speed Rail in Japan: A Review and Evaluation of Magnetic Levitation Trains. California High Speed Rail Series. University of California Transportation Center, University of California at Berkeley, Apr. 1992, 23 pages.
Van Zyl, A.W., et al., Novel secondary design for a linear synchronous motor using a split-pole magnet arrangement. Africon, 1999 IEEE, 1999 vol. 2, pp. 627-630.
Van Zyl, A.W., et al., Reduction of cogging forces in a tubular linear synchronous motor by optimising the secondary design. IEEE Africon 2002, 2002, pp. 689-692.
Weisman, R., et al., Design and demonstration of a locally commutated linear synchronous motor. SAE Technical Paper Series. SAE International: The Engineering Society. Future Transportation Technology Conference and Exposition, Costa Mesa, CA, Aug. 7-10, 1995, 9 pages.
Zhao, F., et al., Automatic design of a maglev controller in state space. Massachusetts Institute of Technology Artificial Intelligence Laboratory. A.I. Memo No. 1303, Dec. 1991, 20 pages.
Zhu, Z.Q., et al., Reduction of cogging force in slotless linear permanent magnet motors. IEE Proc.—Electr. Power Appl., Jul. 1997, vol. 144, issue 4, pp. 277-282.
Zhu, Z.Q., et al., Novel linear tubular brushless permanent magnet motor. EMD97, IEE, Sep. 1-3, 1997, Conference Publilcation No. 4-44, pp. 91-95.

\* cited by examiner

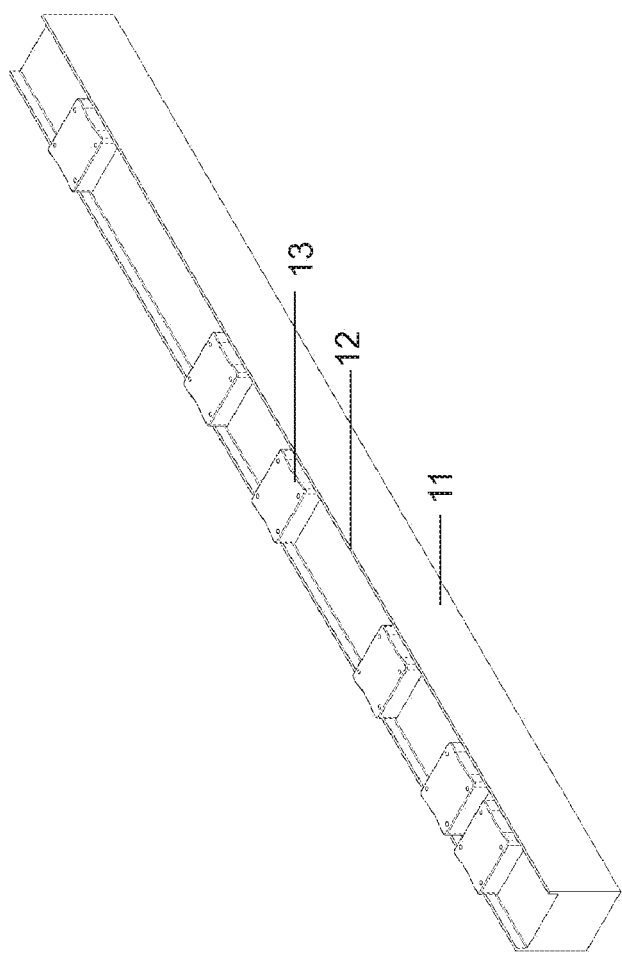
Figure 1. Straight guideway showing vehicles moving in close proximity.

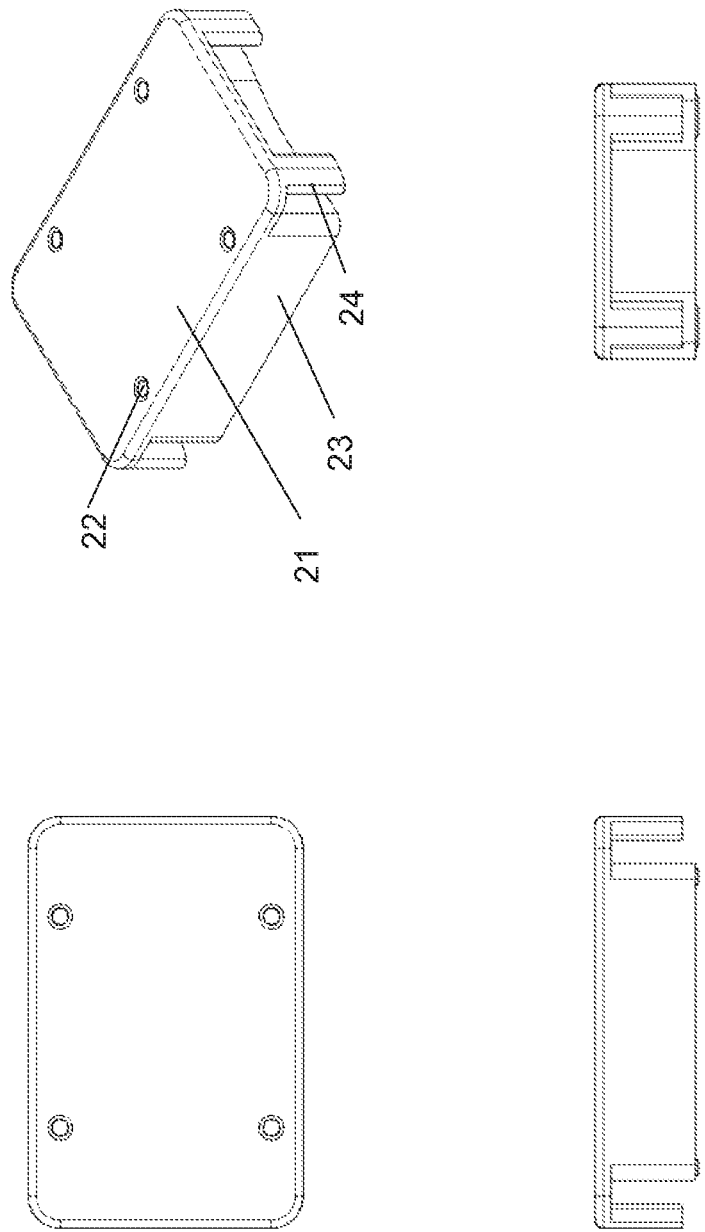
Figure 2. Vehicle for holding objects to be moved.

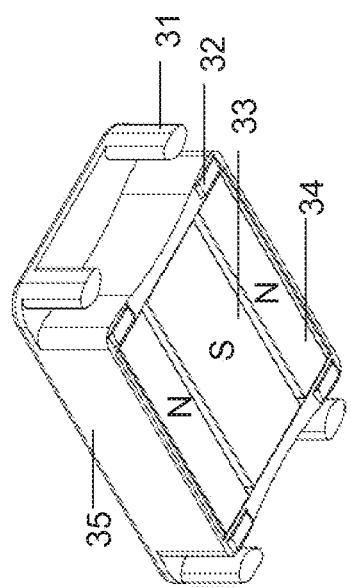
Figure 3. Vehicle showing switch guidance mechanisms and magnet array.

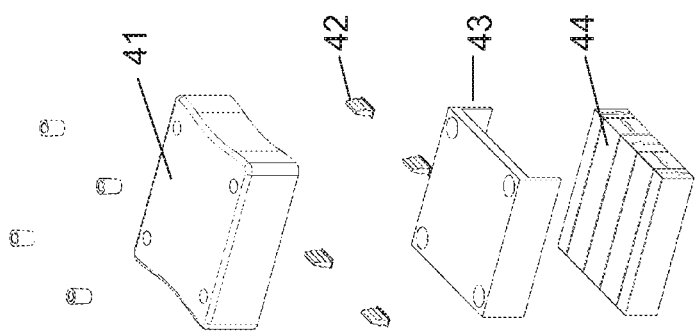
Figure 4. Cutaway view of vehicle showing magnets in a Halbach Array

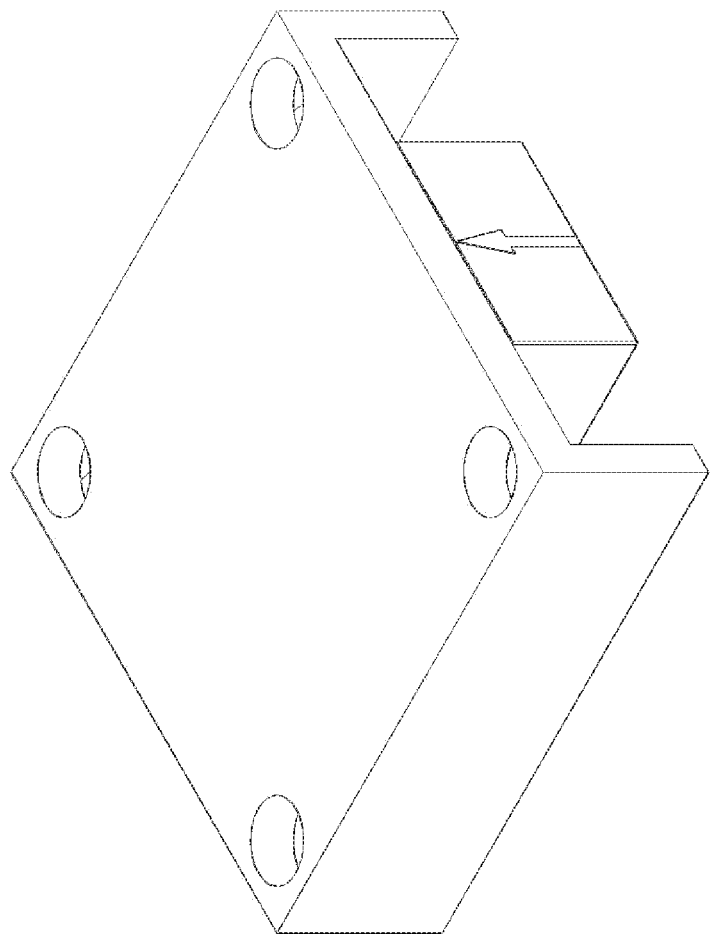
Figure 5. Vehicle with only a single magnet in the magnet array.

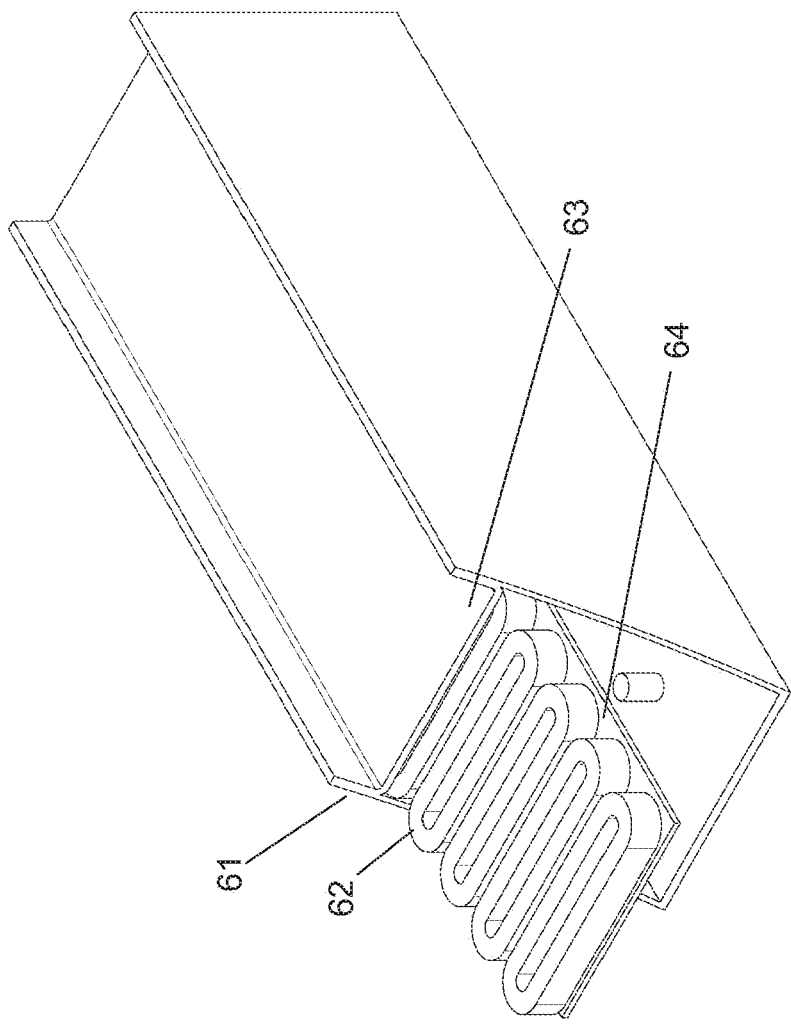
Figure 6. Cutaway housing showing coils mounted close to guideway surface.

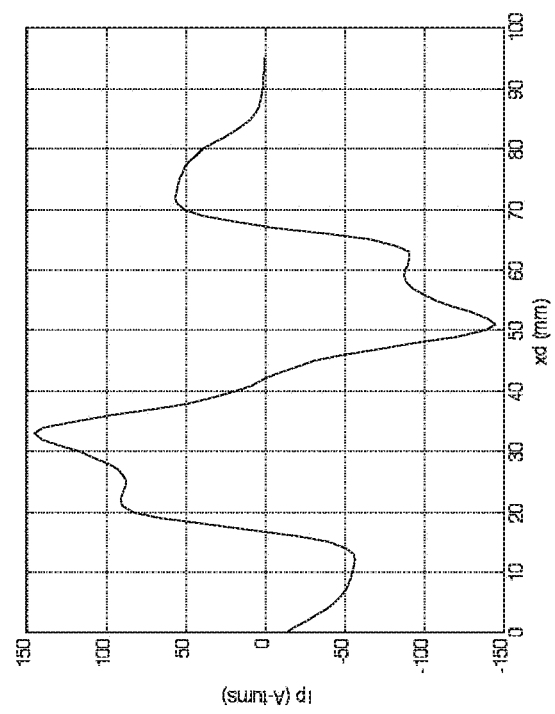
Figure 7. Typical waveform of current in a coil as a vehicle moves by.

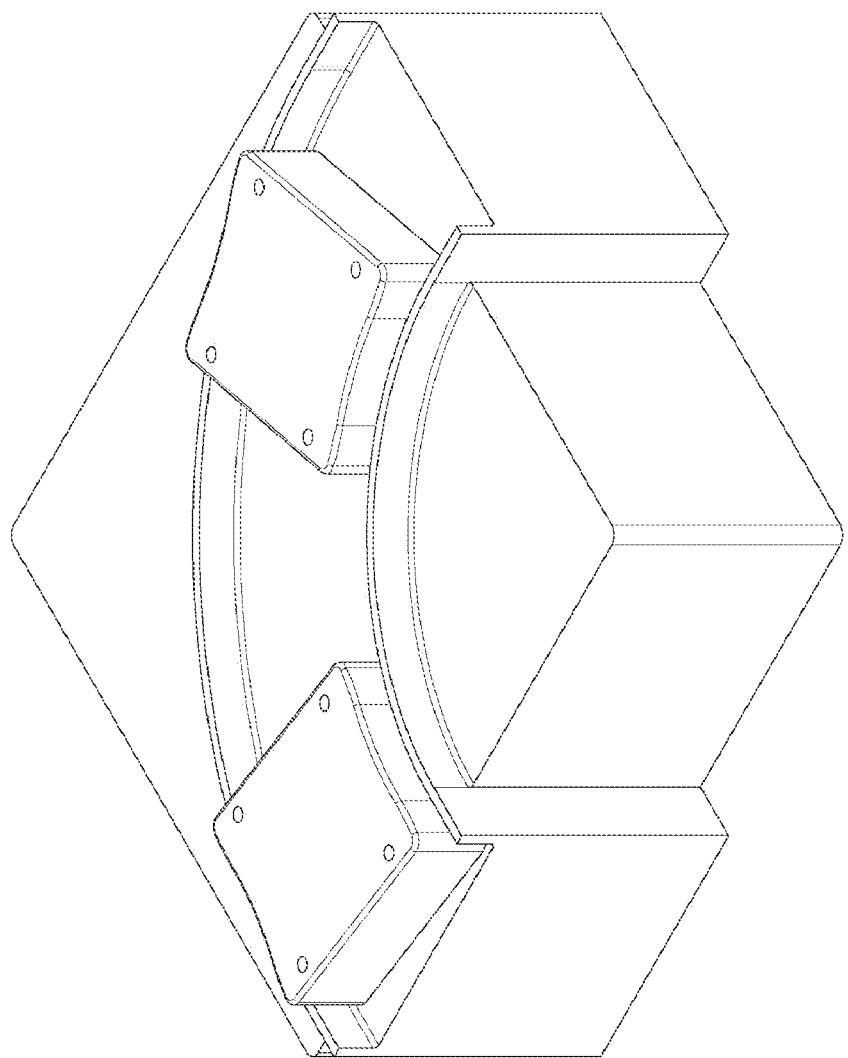
Figure 8. Vehicles negotiating a 90° turn.

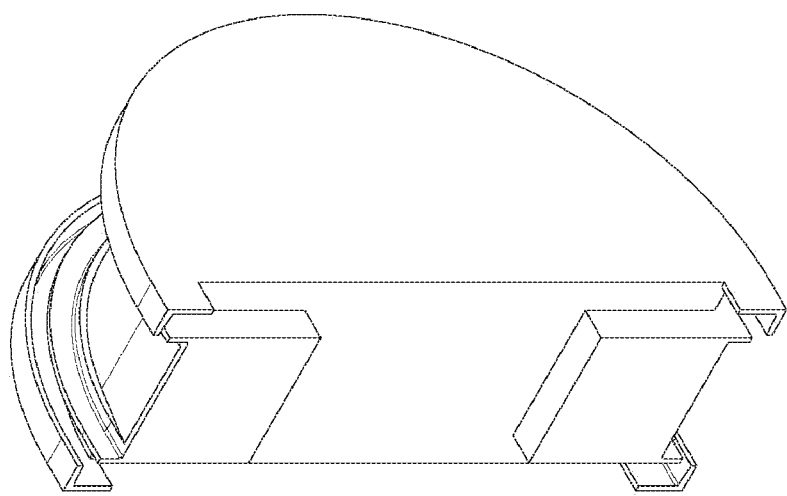
Figure 9. Vehicles negotiating a 180 vertical turn.

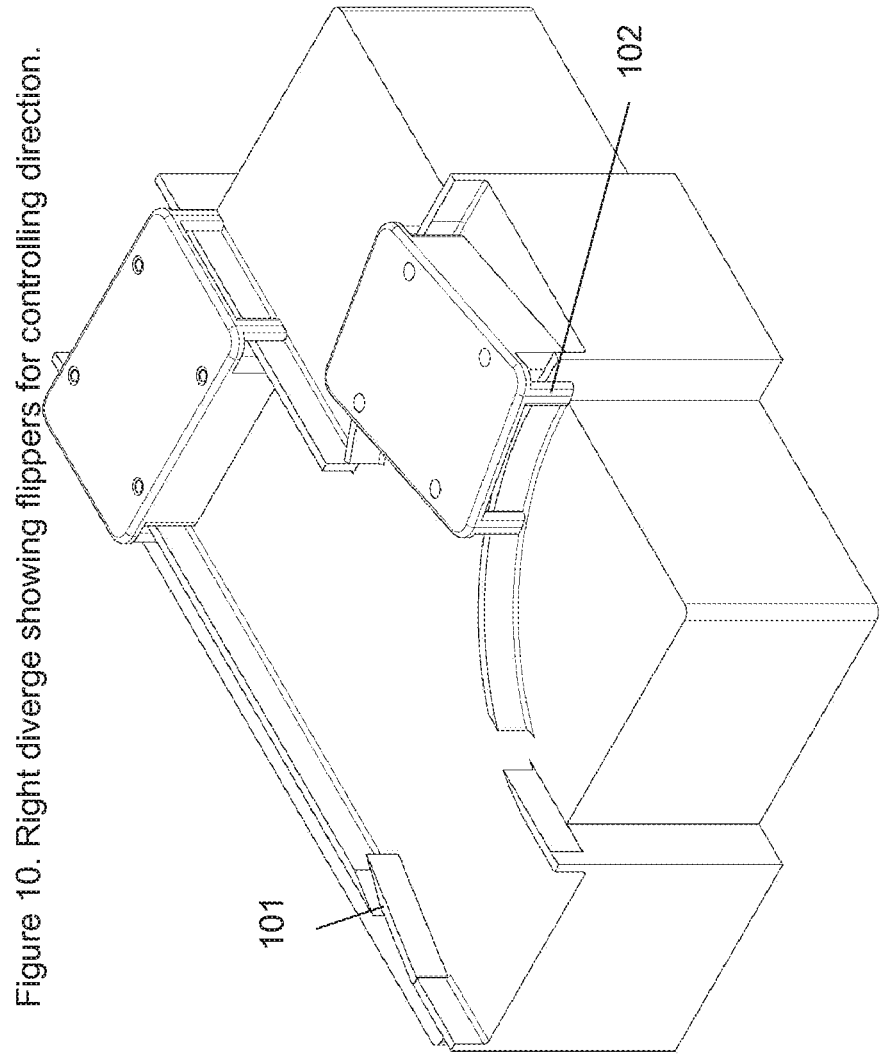
Figure 10. Right diverge showing flippers for controlling direction.

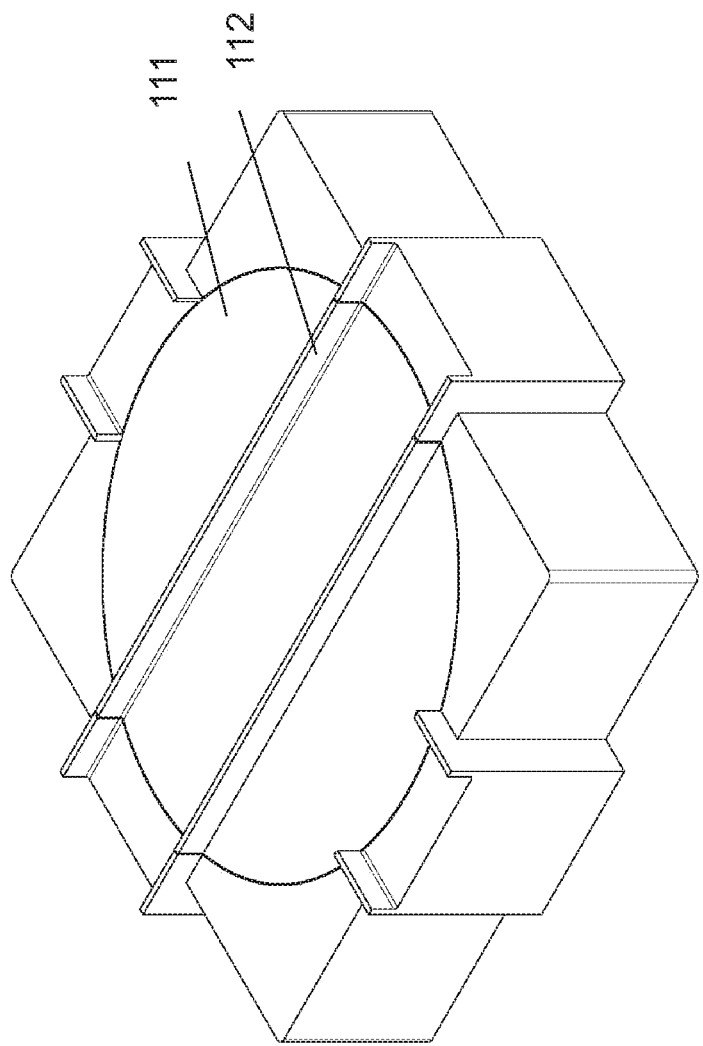
Figure 11. Turntable for turning, merging and diverging.

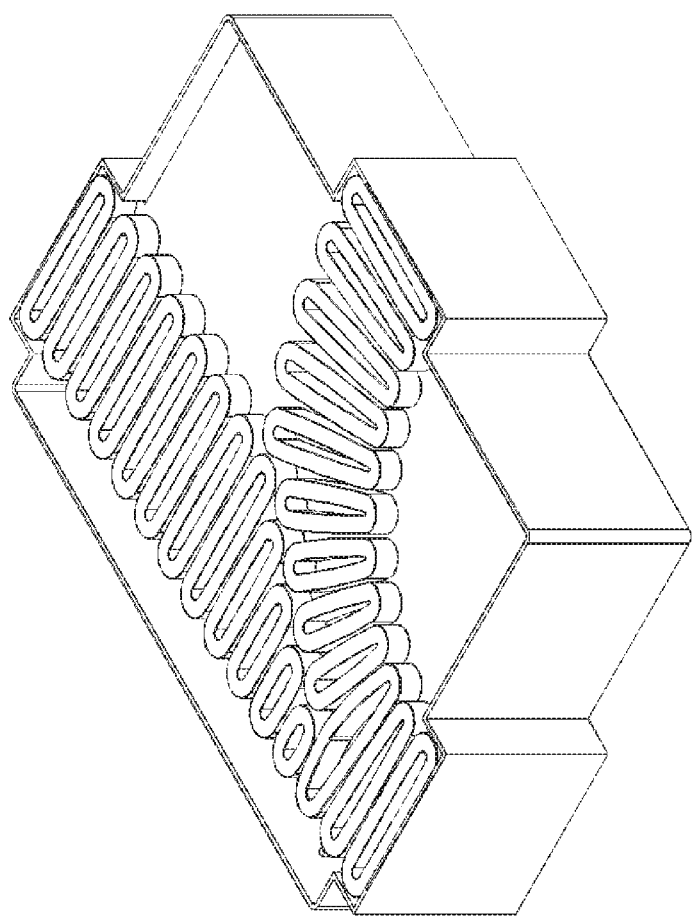
Figure 12. Cutaway view of right diverge showing coils for continuous propulsion

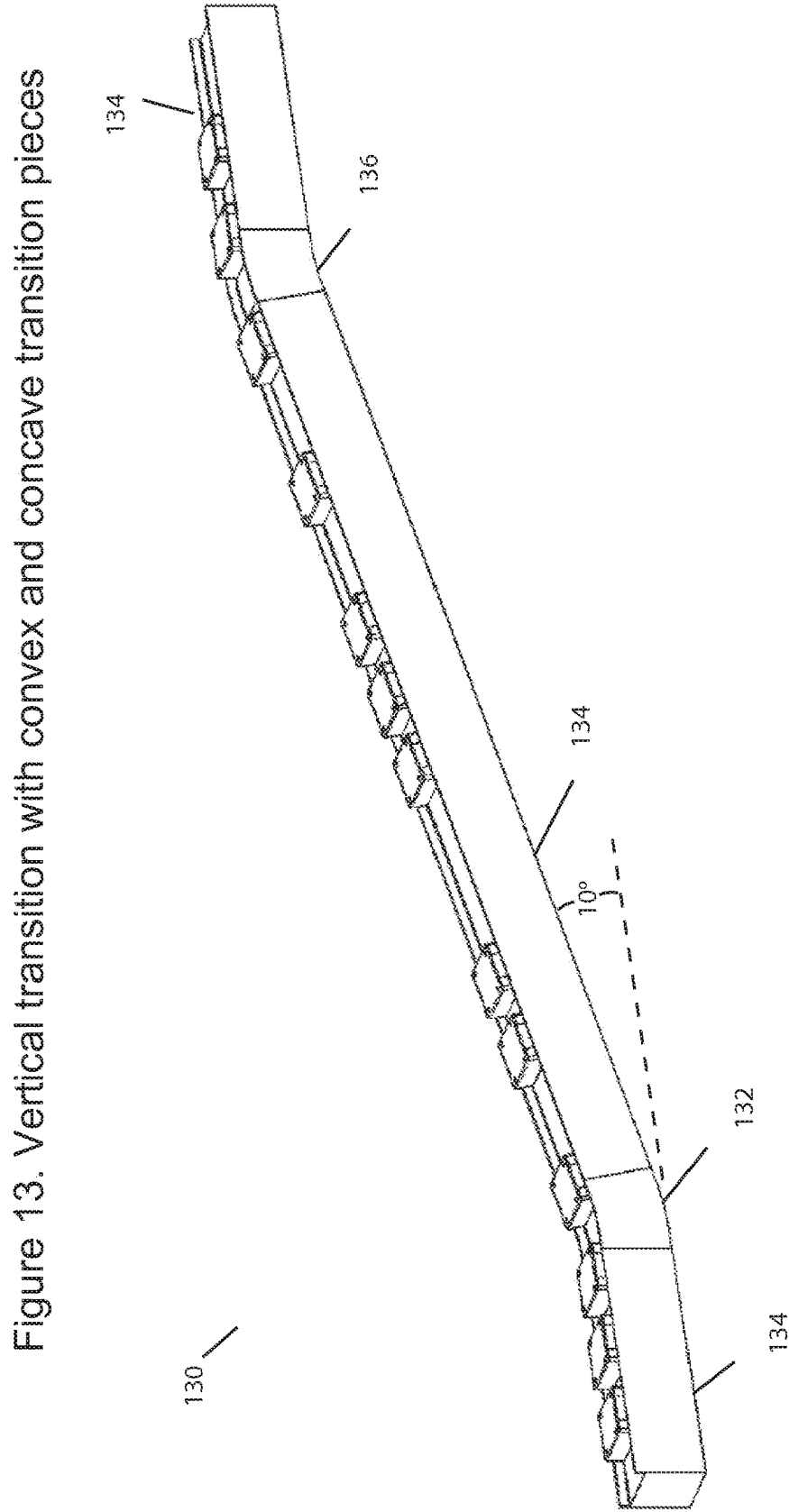
Figure 13. Vertical transition with convex and concave transition pieces

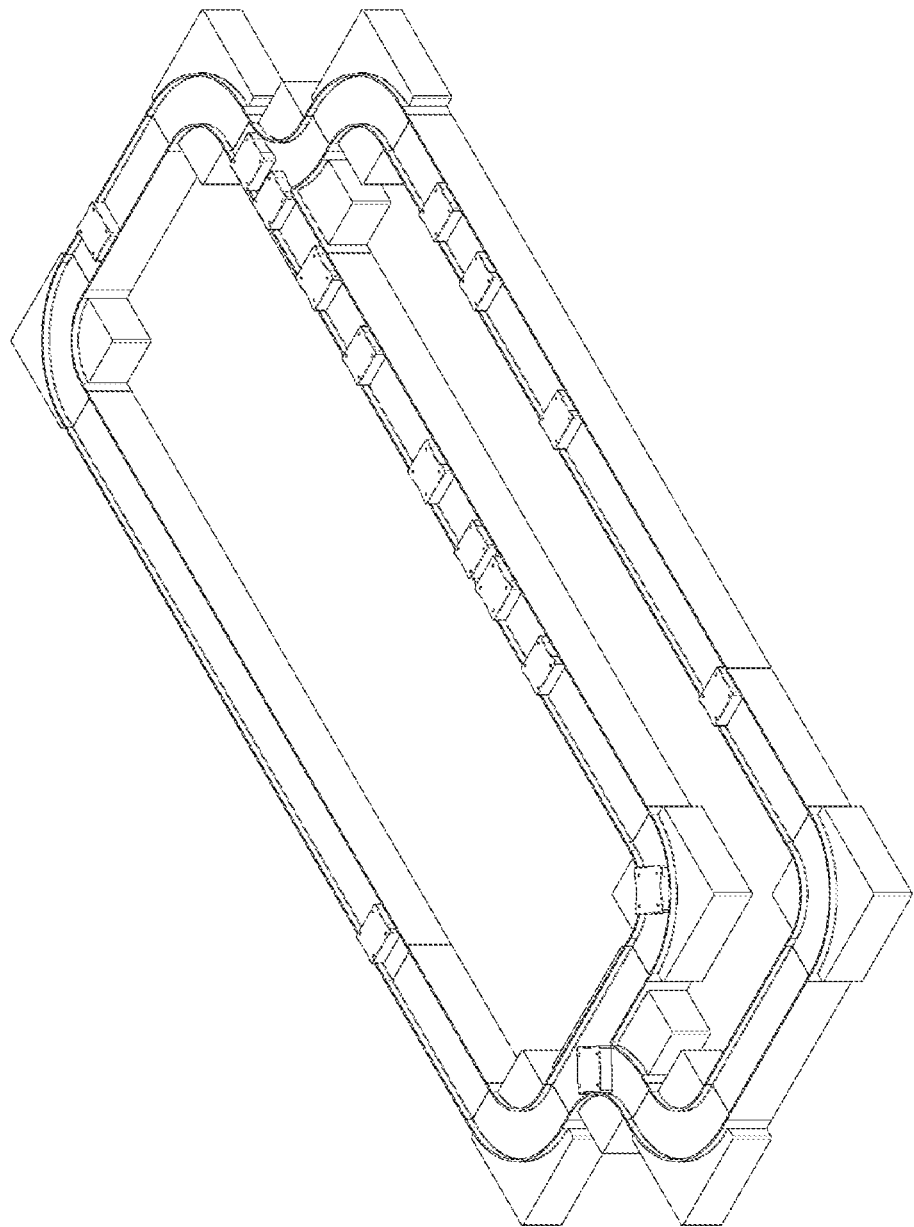
Figure 14. Example of layout showing use of guideway modules.

TRANSPORT SYSTEM POWERED BY SHORT BLOCK LINEAR SYNCHRONOUS MOTORS

CROSS-REFERENCE TO RELATED APPLICATIONS

This application is a continuation of U.S. patent application Ser. No. 14/143,802, filed Dec. 30, 2013, and entitled "TRANSPORT SYSTEM POWERED BY SHORT BLOCK LINEAR SYNCHRONOUS MOTORS." U.S. patent application Ser. No. 14/143,802 is a continuation of U.S. patent application Ser. No. 12/359,022, filed Jan. 23, 2009, entitled "TRANSPORT SYSTEM POWERED BY SHORT BLOCK LINEAR SYNCHRONOUS MOTORS," and now issued as U.S. Pat. No. 8,616,134. Each of these applications is incorporated by reference in its entirety.

BACKGROUND OF THE INVENTION

The invention pertains to transport systems and more particularly, by way of example, to guideway-based transport system with short block linear synchronous motors. The invention has application, by way of non-limiting example, in production lines, laboratories and other applications requiring complex guideways, sharp turns, merge and diverge switching, and/or inverted operation.

There are many types of transport systems that can move objects on a guideway. Examples include: wheel-suspended vehicles propelled by rotary or linear motors, maglev or air-cushion suspended vehicles propelled by linear motors or cables, vehicles that move in tubes propelled by air pressure, vehicles supported or guided by bearings, and vehicles that are moved on conveyor belts. Existing transport systems have many useful applications but there are opportunities for substantial improvement, for example, in the precise movement of relatively small and closely spaced objects on a complex guideway.

Small and medium size objects are often transported on conveyor belts because this eliminates the need for wheels or other mechanisms to suspend, guide and propel the objects. Belt transport systems are relatively inexpensive but they lack precise control that is often needed and they require substantial maintenance because of many moving parts. Other approaches to low cost transport include air propelled vehicle moving in tubes and the use of gravitational forces to move objects down an incline, but these approaches have even less precise control.

The advantages of using linear synchronous motor (LSM) propulsion are well known and described in other patents (by way of non-limiting example, U.S. Pat. Nos. 7,458,454, 7,448,327, 6,983,701, 6,917,136, 6,781,524, 6,578,495, 6,499,701, 6,101,952, and 6,011,508, all assigned to the assignee hereof and the teachings of all of which are incorporated herein by reference), but in many cases, particularly, for example, when moving small and closely spaced objects, the LSM can be more expensive and provide less throughput than competing propulsive systems.

In view of the foregoing, an object of the invention is to provide improved transport systems, apparatus and methods.

A related object of the invention is to provide such systems, apparatus and methods as take advantage of LSM technologies.

Another related object of the invention is to provide such systems, apparatus and methods as are adapted for transport of small objects and/or medium-sized objects.

A further related object of the invention is to provide such systems, apparatus and methods as are adapted for use with closely-spaced objects.

Still another object of the invention is to provide such systems, apparatus and methods as are adapted for use in production lines, laboratories and other applications requiring complex guideways, sharp turns, merge and diverge switching, and/or inverted operation.

SUMMARY OF THE INVENTION

The foregoing are among the objects attained by the invention, which provides in some aspects an LSM-based transport system that includes a guideway with a plurality of coreless propulsion coils disposed along a region in which one or more vehicles disposed on the guideway are to be propelled, as well as electronic power and control circuitry that excites the propulsion coils independently so as to propel the vehicles along the guideway. The vehicles, according to these aspects of the invention, each include a magnetic flux source—for example, one or more Halbach or other magnet arrays.

Systems according to the foregoing aspect are advantageous for, among other reasons, that the vehicles on the guideway can be moved (or propelled) independently of one another in a controlled fashion—e.g., without risk of collision or uncontrolled motion—regardless of their proximity to other vehicles on the guideway.

Related aspects of the invention provide transport systems as described above in which the vehicles are disposed for sliding motion along guideway. In these aspects, the vehicles can have a low coefficient of friction with the guideway, e.g., a coefficient of friction of less than substantially 0.2.

The guideway, according to related aspects of the invention, can include guidance structure—such as rails—that facilitate maintaining the vehicles on the guideway (or, put another way, that inhibit the vehicles from moving off the guideway).

In related aspects of the invention, the guideway of transport systems of the type described above is made up of a plurality of coupled (e.g., interlocked) modules. The propulsion coils may be mounted in those modules and more particularly, according to some aspects of the invention, on printed circuit boards that make up the modules. The coils are disposed within the modules so as to be in close proximity to magnet arrays (or other flux sources) of vehicles passing over them.

In still other related aspects, the invention provides transport systems as described above in which the modules comprise power controllers that form part of the electronic power and control circuitry and that are selectively electrically coupled to one or more of the propulsion coils, e.g., of the respective modules. Microprocessor(s) and/or switches can also be provided to provide electrical coupling between the power control circuitry and the propulsion coils.

Yet still other aspects of the invention provide transport systems as described above in which the guideway comprises merge and/or diverge regions, each of which may include mechanically and/or magnetically actuated switches to alter the course of passing vehicles. These merge and diverge regions, as well as straight-away regions, that make up the guideway may comprise one or more of the aforementioned coupled modules.

Further related aspects of the invention provide transport systems as described above in which at least one of the diverge regions comprises a plurality of coreless propulsion coils spaced along a region in which the course of passing vehicles is altered—that is, spaced along a corner, curve and/or branch—so as to propel the vehicles through the diverge. According to related aspects of the invention, a merge region can be similarly equipped with a plurality of such coils.

Other aspects of the invention provide guideways, guideway modules and vehicles for use thereon, constructed and/or operated as discussed above.

BRIEF DESCRIPTION OF DRAWINGS

A more complete understanding of the invention may be attained by reference to the drawings, in which:

FIG. 1 depicts a system according to the invention, including a straight guideway and vehicles propelled thereon by an LSM in close proximity while sliding on a low friction guideway surface and guided by rails on the side of the guideway.

FIG. 2 shows details of a vehicle according to one practice of the invention used to hold objects for moving on the guideway in FIG. 1.

FIG. 3 shows vehicle guidance mechanisms and magnet array in a system according to one practice of the invention.

FIG. 4 is similar to FIG. 3 but with a Halbach Array for the magnets.

FIG. 5 is similar to FIG. 3 but with a single magnet used for propulsion.

FIG. 6 shows a guideway according to one practice of the invention, including a printed circuit board, with propulsion coils mounted on it, in close proximity to the guideway surface, and connected to power control circuitry on the circuit board.

FIG. 7 shows a typical waveform of current in a coil as a vehicle moves by in a system according to one practice of the invention.

FIG. 8 shows vehicles negotiating a sharp 90° horizontal turn in a system according to one practice of the invention.

FIG. 9 shows vehicles negotiating a sharp 180° vertical turn in a system according to one practice of the invention.

FIG. 10 shows a right diverge in a system according to one practice of the invention with vehicle direction determined by the position of a small flipper.

FIG. 11 shows a turntable which can be used in a system according to one practice of the invention in lieu of a curve to effect diverge and merge operations.

FIG. 12 shows propulsion coils providing continuous force on vehicles moving on a right diverge module of a system according to the invention.

FIG. 13 shows a vertical transition in a system according to one practice of the invention.

FIG. 14 shows an example of a system according to the invention.

DETAILED DESCRIPTION OF THE ILLUSTRATED EMBODIMENT

Introduction

Described here is an LSM-based transport system that allows vehicles to move on a guideway that can be complex and that can include sharp horizontal and vertical turns, merge and diverge switching, and inverted operation. Examples of applications include: moving bottles on an assembly line while they are being filled and capped, moving vials in a laboratory for analysis, moving electronic devices along a production line so that robots can insert components, and sorting objects that arrive from a multiplicity of sources and must be delivered to appropriate locations. In some cases it is feasible to use wheels, bearing or other rolling elements to assist in suspension and guidance, but this invention can also be used in cases where there are no wheels (or other rolling elements) and the vehicles slide on a guideway surface. Wheel-less vehicles can be small and inexpensive when the objects to be moved are not too large. For heavier vehicles the same short block design is suitable for wheel- or bearing-based suspension and guidance.

The result is a transport system that provides an economically viable means of using LSM propulsion to propel and control closely spaced small to medium size vehicles on a guideway.

Among other aspects of the systems described herein are LSM motor modules that also function as the transport system track (or "guideway") pieces. A selection of standard track building blocks fit together in a plug-and-play manner to form an almost endless variety of layout options. The motor modules (or "motors", for short) can contain not only the propulsion and intelligent routing elements, but also the guidance and structural support features to allow for rapid assembly and track configuration. The system is ideally suited, by way of non-limiting example, for environments requiring clean operation and/or wash down capability. It can also support "track and trace" requirements, as each vehicle can be uniquely identified and constantly tracked throughout the system.

A suspension system with a coefficient of friction obtainable with sliding motion can beneficially be used with an LSM with negligible attractive force. This is achieved, in the illustrated embodiment, by using a coreless motor with propulsion coils mounted, e.g., in close proximity to the vehicle magnets.

The text that follows describes components and operation of embodiments of the invention. It is understood that many variations on this design are possible and are contemplated by the invention, but this description shows how to achieve the foregoing and other objectives with a simple system that can be manufactured at a reasonable cost.

Guideway

FIG. 1 shows a straight section of guideway with vehicles 13 moving in close proximity. The structure of the guideway can provide guidance in one or more dimensions by rails 12 on the side. For applications where the vehicle does not have wheels they slide on the guideway surface and special materials (discussed below) are used to minimize friction. The guideway housing 11 contains all of the electronics including position sensing means, propulsion coils, power electronic components, and microprocessors.

The design shown in these Figures is based on vehicles that are about 50 mm wide and 50 to 60 mm long. For larger objects the guideway and vehicle dimensions can be scaled, much as model railroads have been constructed with a variety of scaling factors.

Vehicle

FIGS. 2 and 3 show a vehicle 21 that can be used as part of the proposed transport system. It is relatively small, about 50 mm square and 20 mm high, and has components 32 on the lower surface that slide on the guideway running surface. Holes 22 in the top of the vehicle are used to mount support mechanisms for the objects that are to be moved.

The vehicle has curved sides 23 that match the sides of a curved guideway so as to allow short radius horizontal turns. It is guided by the guideway and can move in a normal upright position when transporting an object as well as moving in an inverted position when not carrying an object. It can also negotiate vertical turns. Pins 24, 31 in the corners of the vehicle interact with mechanisms in the diverge and modules so as to control the direction of motion.

FIG. 3 is a view of the lower surface of the vehicle and shows the permanent magnets 33, 34 that are mounted near the bottom of the vehicle and provide the means for LSM propulsion.

FIG. 4 shows a variation of FIG. 3 in which a Halbach Array 44 is used for the magnet structure so as to create higher force for a given weight. FIG. 5 shows a single magnet structure 51 that is suitable for applications where less force is required.

Larger objects can be moved on this same guideway by using a double-bogey design, as has been used with conventional LSM designs (see, for example, U.S. Pat. No. 7,458,454, entitled "Three-dimensional Motion Using Single-Pathway Based Actuators," issued Dec. 2, 2008, and U.S. Patent Application 2007/0044676, entitled "Guideway Activated Magnetic Switching of Vehicles," published Mar. 1, 2007, the teachings of both of which are incorporated herein by reference), or by increasing the dimensions of guideway and vehicles.

Low Friction Sliding Surface

In order to reduce the required propulsive force and heating from friction, the vehicle and guideway of the illustrated embodiment are designed to minimize the coefficient of friction $c_f$, which is the ratio of the propulsive force needed to move the vehicle to the gravitational force of the vehicle on the guideway. In some cases wheels can be used as a way to reduce this force, but this invention allows the use of wheel-less vehicles. FIG. 6 shows the guideway with low friction surface 63 that supports vehicles in close proximity to the propulsion coils 64.

Examples of low friction for wheel-less applications include Teflon sliding on Teflon and Teflon sliding on stainless steel. Lower friction is possible if the surface can be lubricated by a thin film, but for many applications this is not allowable so the design assumes no lubrication. It is also preferable that the surface have good wear characteristics so, for example, we might use stainless steel on the guideway and Teflon on the vehicle with the expectation that there would be negligible wear on the steel but the vehicle might eventually need to have its sliding surface replaced, an action that is less expensive than replacing the guideway. Sliders 32 in FIG. 3 are examples of how low friction components can me mounted. They may be designed so as to be replaceable if it is expected that they will wear out before the vehicle reaches end of life.

With some designs $c_f$ can be as low a 0.1 but more practical values are in the range 0.15 to 0.2. Because this is a relatively high value it is preferred that the propulsive force not create substantial downward force on the vehicle. A typical LSM using ferromagnetic material will exert an attractive force that is four to six times the propulsive force and with this much attractive force the vehicle may not be able to move, or if it did move there would be substantial heating and power wasted—in such instances, wheels, bearings or other rolling elements can be incorporated for suspension of the vehicles.

Magnet Array

There are many types of magnet arrays that can be used, one of which is shown in FIG. 3. With this design there is one middle magnet 33 that has the South pole on the lower surface and two half magnets 34 on the ends that have a North Pole on the lower surface. Typically the magnets use NdFeB in order achieve high fields but they can use other materials, such as ceramic when cost or external fields must be low or Samarium Cobalt when the operating temperature is high.

One design consideration is the interaction between magnets on adjacent vehicles. The ferromagnetic piece 35 largely prevents magnetic fields from adjacent vehicles from interfering with each other.

FIG. 4 shows a Halbach Array which can be used where higher force is required and the added cost is acceptable. With this design the magnetic field rotates from one magnet to the next with a resulting higher propulsive force than is possible with the magnet design in FIG. 3. Ferromagnetic shield 43 minimizes interactions between the fields of adjacent vehicles.

FIG. 5 shows a single magnet providing all of the magnetic flux with ferromagnetic material on the ends used to provide a return path. This may not produce as much force but can be less expensive than multi-magnet designs.

Linear Motor Propulsion

FIG. 6 shows coils 64 mounted in close proximity to the guideway running surface 63. Currents in these coils are individually controlled via power electronic components and microprocessors so that each vehicle can be individually controlled even when it is touching neighboring vehicles.

A feature of the illustrated embodiment is the lack of ferromagnetic material that is commonly used in an LSM to make it more efficient. With no ferromagnetic material we can not achieve as high a force, but we can limit the attractive force to a small fraction of the propulsive force and thereby allow strong acceleration and braking forces to move the vehicle when the coefficient of friction is on the order of 0.2 or higher.

In embodiments that use wheel-based vehicles the friction force may be small enough that some ferromagnetic material can be used in the stator so as to achieve higher propulsive force.

Software for controlling the microprocessors can be similar to control software used on LSM designs with blocks that are several coils long. Here, however, position sensing components are located close enough together that they can identify individual vehicles even when the vehicles are touching. Such sensing facilitates control of the movement of the vehicles independently of one another on the guideway. Prior demonstrations of locally commutated LSMs have shown that this software does not require special features.

PC Board Mounted Coils and Control Circuitry

The illustrated embodiment permits the control of each coil individually without the cost associated with conventional designs. With reference to FIG. 6, there is shown an embodiment in which the coils 62 are mounted directly on a Printed Circuit Board (PCB) 64. This board supports the coils and provides connections between the coils and the power electronic modules that control the current. Typically each coil is connected to the output of an "H-bridge" with MOSFET or IGBT devices used to control the amount and direction of current in each coil. These components are mounted on the same PCB. The PCB also holds Hall Effect devices that sense the magnetic field produced by the vehicle and allow a microprocessor to create a desired force. FIG. 7 shows a typical waveform of the current in a propulsion coil that will propel a vehicle as it moves by the coil. By proper choice of waveform several propulsion coils can work in unison to create a constant force on the vehicle with minimum power loss in the coil. For braking the sign of the current is reversed.

By mounting the coils directly on a PC board and by using integrated power controllers it is possible to reduce the cost for the coils and electronics. One microprocessor can control a multiplicity of H-bridges but with a coil spacing on the order of 16 mm there can be more than a dozen microprocessors per meter of motor, and the operation of these motor controllers must be coordinated by a higher level "node" controller. With modern semiconductor technology, and for low to moderate power levels, all of these components can be mounted on only one or two PCBs that are contained in the motor housing.

Guideway Modules

The guideway is built of modules much as a model train layout is constructed from modules. FIGS. 6, 8-11 and 13 show examples of a straight section, a 90° horizontal curve, a 180° vertical curve, a right diverge switch, a turntable, and a vertical transition. These components can be interconnected in a variety of ways to meet the requirements of many and diverse applications.

The 180° vertical curve in FIG. 9 is primarily used as a means to return empty vehicles to a starting point and vehicles negotiating this curve may be controlled and propelled by other means than an LSM. For example, vehicles going down may be propelled by gravity and vehicles going up may be propelled by interaction with a mechanical mechanisms and in both cases there may not be precise control during the curve transition. It is preferable that once the vehicles have negotiated this curve precise control is regained. In some cases there is a vertical curve with a much larger curve radius, such as used as a transition between a level guideway and an inclined guideway. (See, for example, FIG. 13). In this case LSM propulsion can be used for the vertical curve and thereby retain precise control through the curve.

FIG. 9 shows a right diverge using a small mechanical or magnetic flipper 101 that directs a moving vehicle to go either straight ahead or diverge to the right. The flipper is controlled by a linear or rotary actuator that interacts with pins 102 on the vehicle to steer the vehicle in the correct direction. The same device can be used to merge two streams of vehicles. The flipper is small and light so it can move from one position to another in a small fraction of a second and thereby allow high throughput with adjacent vehicles able to be switched independently. A left diverge can be constructed as a mirror image of the right diverge.

FIG. 11 shows a turntable 111 as an alternative to the flipper. Guidance rails 112 on the turntable and propulsion coils, not shown, guide and propel the vehicle. The turntable in FIG. 11 can rotate in 90° increments, but other designs can support motion for a variety of angles. The turntable tends to be slower than the flipper because of the added mass, but is less expensive for some applications and has greater versatility because it can be used in lieu of curves as well as to reverse vehicle direction and switch between a multiplicity of tracks.

FIG. 13 depicts a vertical transition 130. In the illustrated embodiment, this includes a concave transition piece 132, straight sections 134 and a convex transition piece 136, coupled as shown. The illustrated transition is 10° along the vertical axis, though, in other embodiments greater or lesser angles may be employed. Although the angle of the vertical transition shown here is established by transition pieces 132, 136, in other embodiments the transition may be defined by other pieces (e.g., incorporated into diverges, straight-sections, and so forth).

The switching function can also be provided by magnetic forces acting on the vehicle. For example, coils on and near the guideway can be controlled so as to create lateral forces that will perform the switching function. This approach to switching is described in U.S. Patent Application US 2007/0044676, entitled "Guideway Activated Magnetic Switching of Vehicles," the teachings of which are incorporated herein by reference.

FIG. 12 shows a cutaway view of a guideway diverge module showing propulsion coils for propelling vehicles on either of two paths. This continuous propulsion through a diverge or merge is essential to providing precise position control at all times.

A further appreciation of techniques for packaging the linear motor and other module components of the guideway modules may be attained by reference to U.S. Pat. No. 6,578,495, entitled "Modular Linear Motor Tracks and Methods of Fabricating Same," assigned to the assignee hereof, the teachings of which are incorporated herein by reference.

Application Example

There are many possible applications but the simple layout in FIG. 14 shows how the guideway modules can be interconnected. Vehicles move around the main loop but can move though a bypass when desired. Typical applications will use many more guideway modules than in this simple example.

Described above are systems, apparatus and method meeting the foregoing objects, among others. It will be appreciated that the embodiments illustrated and discussed herein are merely examples of the invention and that other embodiments, incorporating changes thereto, fall within the scope of the invention. Thus, by way of non-limiting example, the invention can be practiced with embodiment in which suspension is provided by air-cushion and fluid-cushion, e.g., in addition to the wheel-less, wheeled, and other roller-based designs discussed above, of which we claim:

The invention claimed is:

1. A transport system, comprising
   A. a guideway including a plurality of coreless propulsion coils disposed along a region in which one or more vehicles are to be propelled,
   B. one or more vehicles disposed on the guideway, each containing a magnetic flux source,
   C. electronic power and control circuitry that excites the propulsion coils independently so as to propel the one or more vehicles along the guideway.

2. The transport system of claim 1, wherein one or more of the vehicles are slidingly disposed on the guideway.

3. The transport system of claim 1, comprising guidance structure on any of the guideway and the one or more vehicles that inhibit the one or more vehicles from moving off the guideway.

4. The transport system of claim 3, wherein the guidance structure comprises one or more rails that are disposed on the guideway.

5. The transport system of claim 1, wherein the magnet flux source of at least one of the vehicles comprises one or more magnets.

6. The transport system of claim 5, wherein the plurality of coils are disposed in the guideway for close proximity to the one or more magnets of passing vehicles.

7. The transport system of claim 5 wherein the one or more magnets comprise a Halbach magnet array.

8. The transport system of claim 1, wherein the propulsion coils are mounted on one or more printed circuit boards.

9. The transport system of claim 1, wherein the guideway comprises a plurality of coupled modules.

10. The transport system of claim 8, wherein one or more of the modules include one or more of the printed circuit boards with propulsion coils mounted thereon.

11. The transport system of claim 10, wherein one or more of the modules comprise one or more power controllers that form part of the electronic power and control circuitry and that are selectively electrically coupled to one or more of the propulsion coils.

12. The transport system of claim 11, wherein the one or more power controllers are selectively electrically coupled to the propulsion coils of the associated module for independent control thereof.

13. The transport system of claim 12, wherein one or more of the modules comprise one or more microprocessors and one or more switches that provide electrical coupling between the power control circuitry and the propulsion coils.

14. The transport system of claim 1 comprising one or more position sensors that monitor the position of vehicles moving on the guideway.

15. A transport system, comprising
   A. a guideway comprising a plurality of propulsion coils,
   B. one or more vehicles disposed on the guideway, each of the one or more vehicles containing a magnetic flux source,
   C. control circuitry that excites the propulsion coils so as to propel the one or more vehicles along the guideway,
   D. wherein one or more of the propulsion coils are mounted on a printed circuit board.

16. The transport system of claim 15, wherein the guideway comprises a plurality of coupled modules.

17. The transport system of claim 15, wherein one or more of the modules include one or more of the printed circuit boards with propulsion coils mounted thereon.

18. The transport system of claim 17, wherein one or more of the modules comprise one or more power controllers that are selectively electrically coupled to the propulsion coils on that module.

19. The transport system of claim 18, wherein the power controller is selectively electrically coupled to the one or more propulsion coils of the associated module for independent control thereof.

20. The transport system of claim 19, wherein one or more of the power controllers each contain a microprocessor.

21. A transport system, comprising
   A. a guideway that guides one or more vehicles and that includes at least one of a merge region and a diverge region,
   B. one or more vehicles disposed on the guideway, each containing a magnetic flux source,
   C. electronic power and control circuitry that excites the propulsion coils so as to propel the one or more vehicles independently of one another along the guideway.

22. The transport system of claim 21, wherein the guideway comprises a straight-away region, along with at least one of a merge region and a diverge region.

23. The transports system of claim 22, wherein any of the merge region and the diverge region include a mechanically actuated switch that alters a course of a vehicle passing thereon.

24. The transport system of claim 22, wherein any of the merge region and the diverge region include a magnetically actuated switch that alters a course of a vehicle passing thereon.

25. The transport system of claim 21, wherein one or more of the vehicles are slidingly disposed on the guideway.

26. The transport system of claim 25, wherein one or more of the vehicles that are slidably disposed on the guideway have a low coefficient of friction therewith.

27. The transport system of claim 26, wherein the coefficient of friction is less then substantially 0.2.

28. The transport system of claim 21, wherein one or more of the vehicles are disposed for rolling motion on the guideway.

29. The transport system of claim 21, wherein one or more of the vehicles are disposed on wheels for rolling motion on the guideway.

30. The transport system of claim 21, wherein at least one of said merge regions and diverge regions comprises a plurality of coreless propulsion coils disposed along a region in which the course of passing vehicles is altered.

31. The transport system of claim 21, wherein at least one of said merge regions and diverge regions comprises a plurality of coreless propulsion coils disposed along a corner, curve and/or branch defining the merge or diverge, respectively, so as to propel the vehicles therethrough.

32. A transport system comprising
   a guideway comprising one or more rails that guide the vehicle;
   a vehicle with mechanisms to interact with the guideway rails for guidance and containing one or more magnet arrays that can be used for propulsion;
   a multiplicity of coils that are mounted in close proximity to the magnets of passing vehicles and can be excited so as to provide forces on the vehicle magnets;
   a means for interconnecting the coils to electronic power control circuitry that includes switching devices and one or more microprocessors;
   position sensors that monitor the position of vehicles moving on the guideway;
   software for controlling microprocessors that controls the coil currents in response to commands and synchronized to the motion of the vehicles;
   and an energy source that provides power for the propulsion of the vehicles.

33. A transport system comprising
   a guideway comprising one or more rails that guide the vehicle in at least two dimensions;
   a vehicle with mechanisms to interact with the guideway rails for guidance and containing one or more magnet arrays that can be used for propulsion;
   a surface on the lower side of the vehicle that slides on a surface on the guideway whereby the combination of surfaces has a low coefficient of friction;
   a multiplicity of coils that are mounted in close proximity to the magnets of passing vehicles and can be excited so as to provide forces on the vehicle magnets;
   a means for interconnecting the coils to electronic power control circuitry that includes switching devices and one or more microprocessors;
   position sensors that monitor the position of vehicles moving on the guideway;
   software for controlling microprocessors that controls the coil currents in response to commands and synchronized to the motion of the vehicles;
   and an energy source that provides power for the propulsion of the vehicles.

34. A transport system comprising
   a guideway comprising one or more rails that guide the vehicle in at least two dimensions;

a vehicle that is approximately 50 mm square with mechanisms to interact with the guideway rails for guidance and containing one or more magnet arrays that can be used for propulsion;

a surface on the lower side of the vehicle that slides on a surface on the guideway whereby the combination of surfaces has a coefficient of friction of less than 0.2;

a multiplicity of coils that are mounted within a few mm of the magnets of passing vehicles and can be excited so as to provide forces on the vehicle magnets with at least three coils able to create a propulsive force on a single vehicle;

a means for interconnecting the coils to electronic power control circuitry that includes switching devices and one or more microprocessors;

position sensors that monitor the position of vehicles moving on the guideway;

software for controlling microprocessors that controls the coil currents in response to commands and synchronized to the motion of the vehicles;

and an energy source that provides power for the propulsion of the vehicles.

35. A guideway module for use in a transport system, the guideway module comprising
    A. one or more coreless propulsion coils disposed along a region in which one or more vehicles that include magnetic flux sources are to be propelled,
    B. electronic power and control circuitry that excites the one or more propulsion coils independently of one or more other propulsion coils in any of
        (a) the guideway module, and
        (b) a guideway in which that guideway module is incorporated,
        so as to control movement of one or more vehicles passing over the guideway module.

36. The guideway module of claim 35 adapted for sliding motion of the one or more vehicles thereon.

37. The guideway module of claim 35, comprising guidance structure that inhibits motion of vehicles off the guideway.

38. The guideway module of claim 37, wherein the guidance structure comprises one or more rails.

39. The guideway module of claim 38, wherein the one or more propulsion coils are disposed for close proximity to the one or more magnets defining flux sources on the one or more vehicles passing over the module.

40. The guideway module of claim 35, wherein the propulsion coils are mounted on one or more printed circuit boards.

41. The guideway module of claim 35, arranged for interlocking coupling with one or more such modules.

42. The guideway module of claim 38, comprising one or more power controllers that form part of the electronic power and control circuitry and that are selectively electrically coupled to one or more of the propulsion coils.

43. The guideway module of claim 42, wherein the one or more power controllers are selectively electrically coupled to the propulsion coils of the associated module for independent control thereof.

44. The guideway module of claim 35 comprising one or more position sensors that monitor the position of vehicles moving thereon.

45. A guideway module defining any of a merge and a diverge for use in a transport system, the guideway module altering a course of a vehicle passing thereover, comprising
    A. one or more coreless propulsion coils disposed along a region in which one or more vehicles that include magnetic flux sources are to be propelled,
    B. electronic power and control circuitry that excites the one or more propulsion coils independently of one or more other propulsion coils in any of
        (a) the guideway module, and
        (b) a guideway in which that guideway module is incorporated,
        so as to independently propel one or more vehicles passing over the guideway module.

46. The guideway module of claim 45, comprising a mechanically actuated switch that alters a course of a vehicle passing thereon.

47. The guideway module of claim 45, comprising a magnetically actuated switch that alters a course of a vehicle passing thereon.

48. The guideway module of claim 45, comprising a plurality of coreless propulsion coils disposed along a region in which the course of passing vehicles is altered.

49. The guideway module of claim 45, comprising a plurality of coreless propulsion coils disposed along a corner, curve and/or branch defining the merge or diverge, respectively, so as to propel the vehicles therethrough.

50. A guideway for use in a transport system, the guideway comprising one or more couplable modules, each including
    A. one or more coreless propulsion coils disposed along a region in which one or more vehicles that include magnetic flux sources are to be propelled,
    B. electronic power and control circuitry that excites the one or more propulsion coils independently one or more other propulsion coils in any of
        (a) the guideway module, and
        (b) a guideway in which that guideway module is incorporated,
        so as to propel one or more vehicles passing over the guideway module.

51. A vehicle for use in a transport system, comprising a flux source and adapted to be propelled along a guideway comprising
    A. one or more coreless propulsion coils disposed along a region in which one or more vehicles that include magnetic flux sources are to be propelled,
    B. electronic power and control circuitry that excites the one or more propulsion coils independently of one or more other propulsion coils so as to propel the vehicle.

* * * * *